US012026831B2

(12) United States Patent
Lee et al.

(10) Patent No.: US 12,026,831 B2
(45) Date of Patent: Jul. 2, 2024

(54) ELECTRONIC DEVICE AND METHOD FOR SPATIAL MAPPING USING THE SAME

(71) Applicant: Samsung Electronics Co., Ltd., Gyeonggi-do (KR)

(72) Inventors: Sanghun Lee, Gyeonggi-do (KR); Sungoh Kim, Gyeonggi-do (KR); Donghwan Seo, Gyeonggi-do (KR); Byeongyong Ahn, Gyeonggi-do (KR); Dasom Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 17/969,787

(22) Filed: Oct. 20, 2022

(65) Prior Publication Data
US 2023/0128662 A1 Apr. 27, 2023

Related U.S. Application Data

(63) Continuation of application No. PCT/KR2022/015264, filed on Oct. 11, 2022.

(30) Foreign Application Priority Data

Oct. 27, 2021 (KR) .................. 10-2021-0144911

(51) Int. Cl.
*G06T 17/05* (2011.01)
*G06F 3/01* (2006.01)
(Continued)

(52) U.S. Cl.
CPC .............. *G06T 17/05* (2013.01); *G06F 3/013* (2013.01); *G06F 3/14* (2013.01); *G06T 7/50* (2017.01);
(Continued)

(58) Field of Classification Search
CPC .. G06T 17/05; G06T 7/50; G06T 7/70; G06T 17/20; G06T 2210/08; G06T 2210/36;
(Continued)

(56) References Cited

U.S. PATENT DOCUMENTS 9,216,347 B2   12/2015   Mutschler et al.
9,255,813 B2   2/2016   Liu et al.
(Continued)

FOREIGN PATENT DOCUMENTS

JP   2002-279449 A   9/2002
JP   2013-206316 A   10/2013
(Continued)

OTHER PUBLICATIONS

International Search Report dated Jan. 26, 2023.

*Primary Examiner* — Maurice L. McDowell, Jr.
(74) *Attorney, Agent, or Firm* — Cha & Reiter, LLC

(57) ABSTRACT

An electronic device and method are disclosed. The electronic device includes a first and second camera, display, memory and processor. The processor implements the method, including acquiring image data of an external environment via the first camera, detecting a plurality of objects included in the image data, identifying a first object corresponding to the detected gaze among the detected plurality of objects, configuring a first precision for spatial mapping of the identified first object and a second precision of at least one other object from among the detected plurality of objects, wherein the first precision is higher than the second precision, executing 3D spatial mapping on the image data using the first precision for the identified first object and the second precision for the at least one other object, and displaying a 3D space generated based on the image data and the spatial mapping.

20 Claims, 17 Drawing Sheets

(51) Int. Cl.
  *G06F 3/14* (2006.01)
  *G06T 7/50* (2017.01)
  *G06T 7/70* (2017.01)
  *G06V 10/25* (2022.01)

(52) U.S. Cl.
  CPC ............... G06T 7/70 (2017.01); G06V 10/25 (2022.01); *G06V 2201/07* (2022.01)

(58) Field of Classification Search
  CPC ......... G06T 19/006; G06F 3/013; G06F 3/14; G06F 3/017; G06V 10/25; G06V 2201/07; G06V 20/20; G06V 40/19; G09G 2340/0407
  See application file for complete search history.

(56) References Cited

U.S. PATENT DOCUMENTS

| | | | |
|---|---|---|---|
| 9,720,497 B2 | 8/2017 | Jang et al. | |
| 10,203,754 B2 | 2/2019 | Kim et al. | |
| 10,339,716 B1 | 7/2019 | Powers et al. | |
| 10,613,413 B1* | 4/2020 | Lu | G06T 7/521 |
| 10,713,852 B2 | 7/2020 | Molyneaux et al. | |
| 10,739,849 B2 | 8/2020 | Stafford et al. | |
| 10,955,914 B2 | 3/2021 | Burns et al. | |
| 2014/0168262 A1* | 6/2014 | Forutanpour | G06T 19/006 345/633 |
| 2018/0003962 A1* | 1/2018 | Urey | G02B 27/0093 |
| 2018/0275410 A1 | 9/2018 | Yeoh et al. | |
| 2021/0287443 A1* | 9/2021 | Pateriya | G06T 19/006 |
| 2023/0162455 A1* | 5/2023 | Busto | G06F 3/016 345/633 |

FOREIGN PATENT DOCUMENTS

| | | |
|---|---|---|
| JP | 2015-118578 A | 6/2015 |
| KR | 10-2014-0144510 A | 12/2014 |
| KR | 10-1670147 B1 | 11/2016 |
| KR | 10-2018-0004077 A | 1/2018 |
| KR | 10-2019-0121280 A | 10/2019 |
| KR | 10-2019-0130147 A | 11/2019 |
| KR | 10-2244620 B1 | 4/2021 |
| KR | 10-2021-0128203 A | 10/2021 |
| WO | 2013/056187 A1 | 4/2013 |

\* cited by examiner

FIG. 4
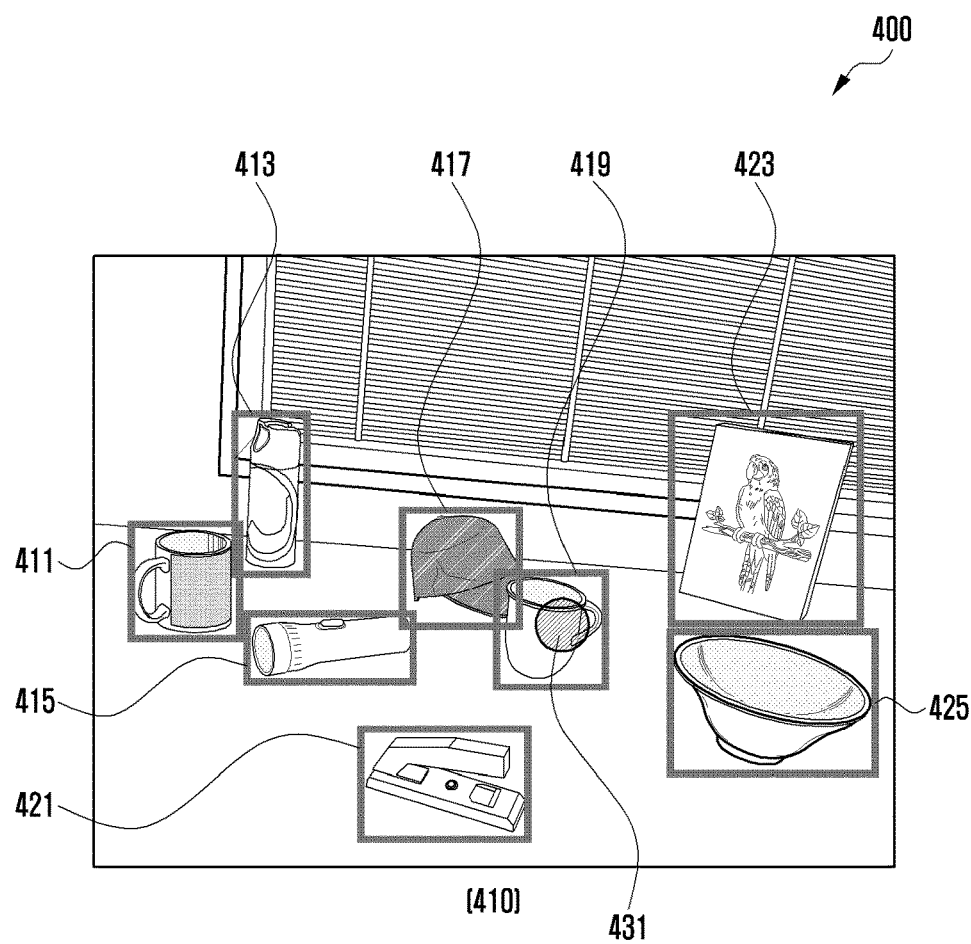
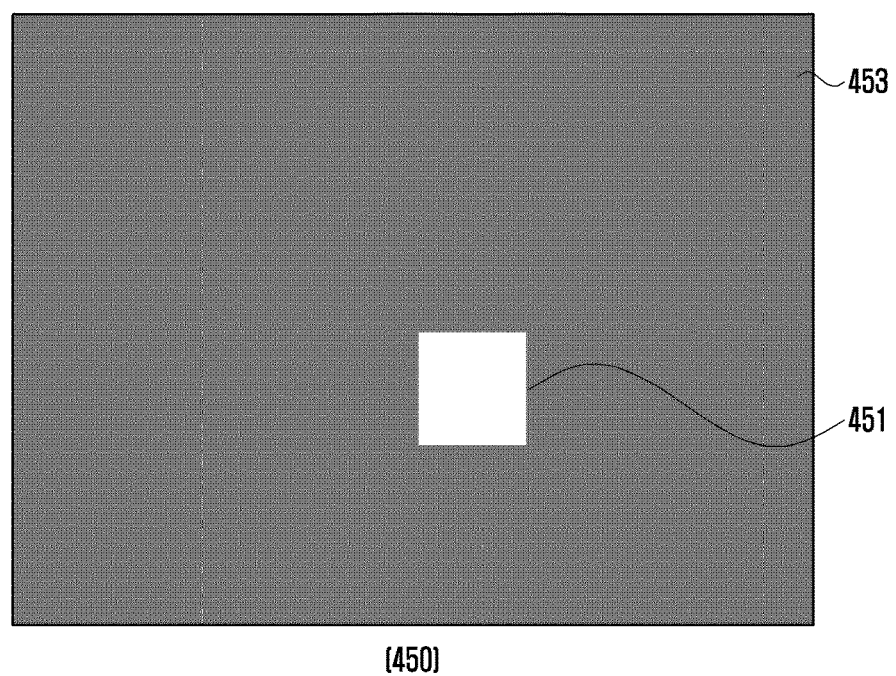

FIG. 5
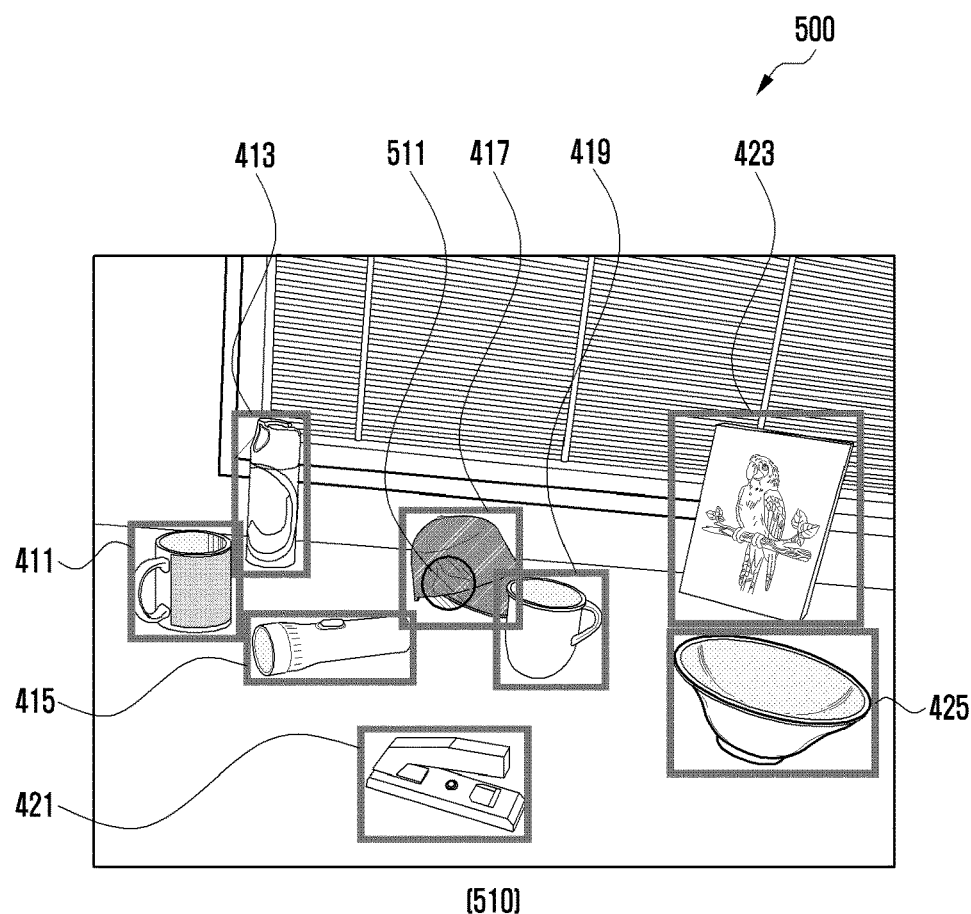
(510)
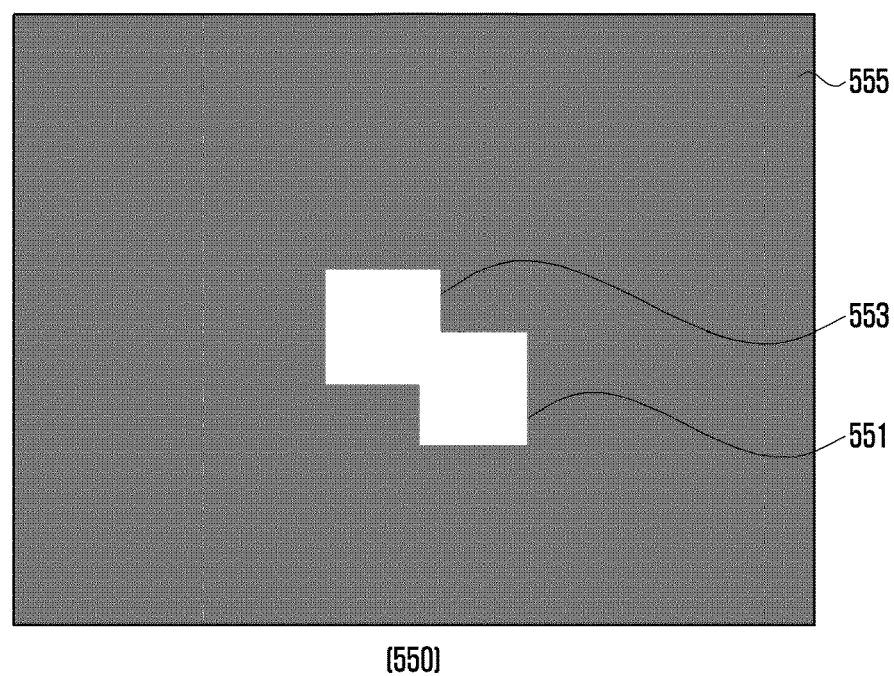
(550)

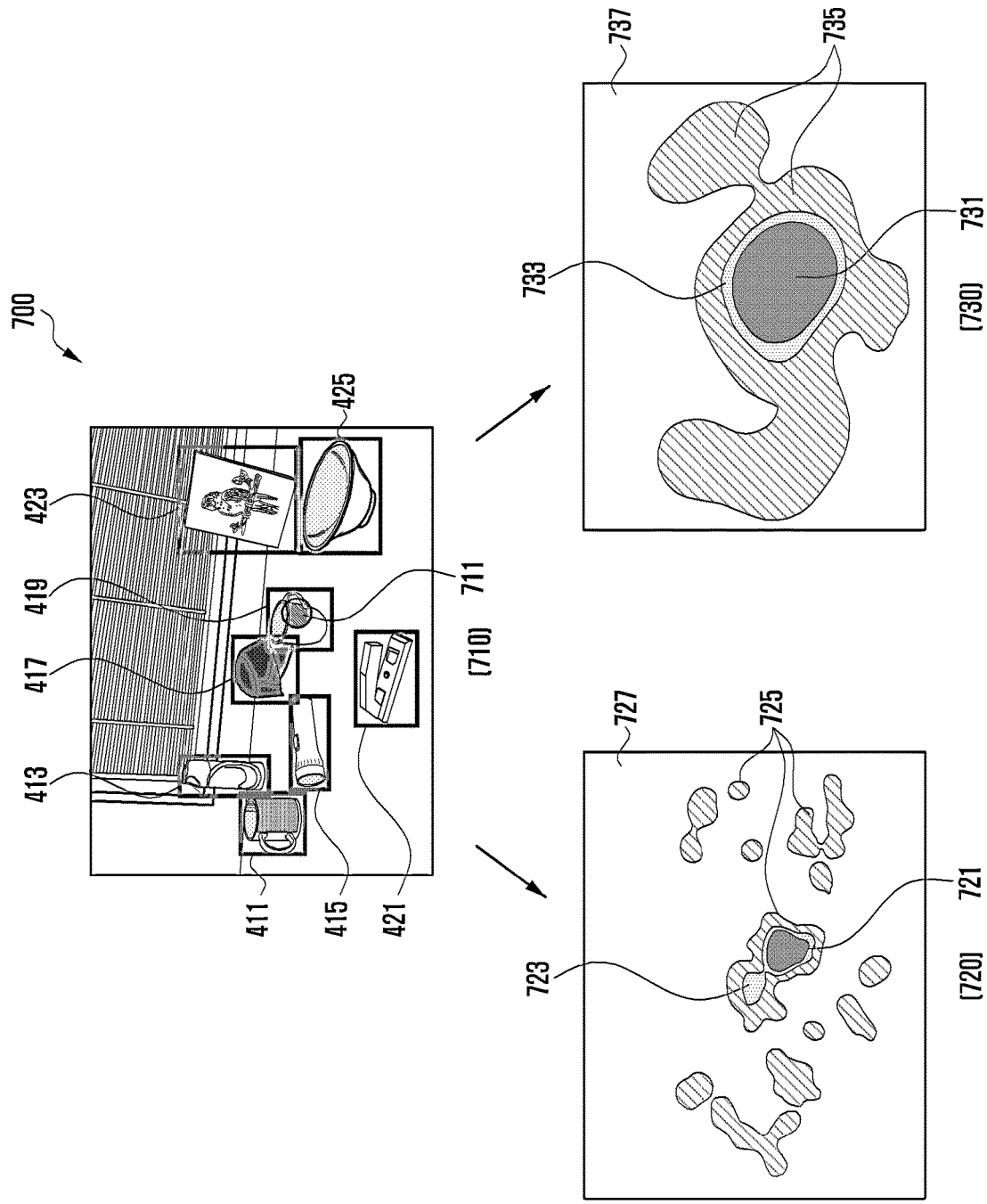

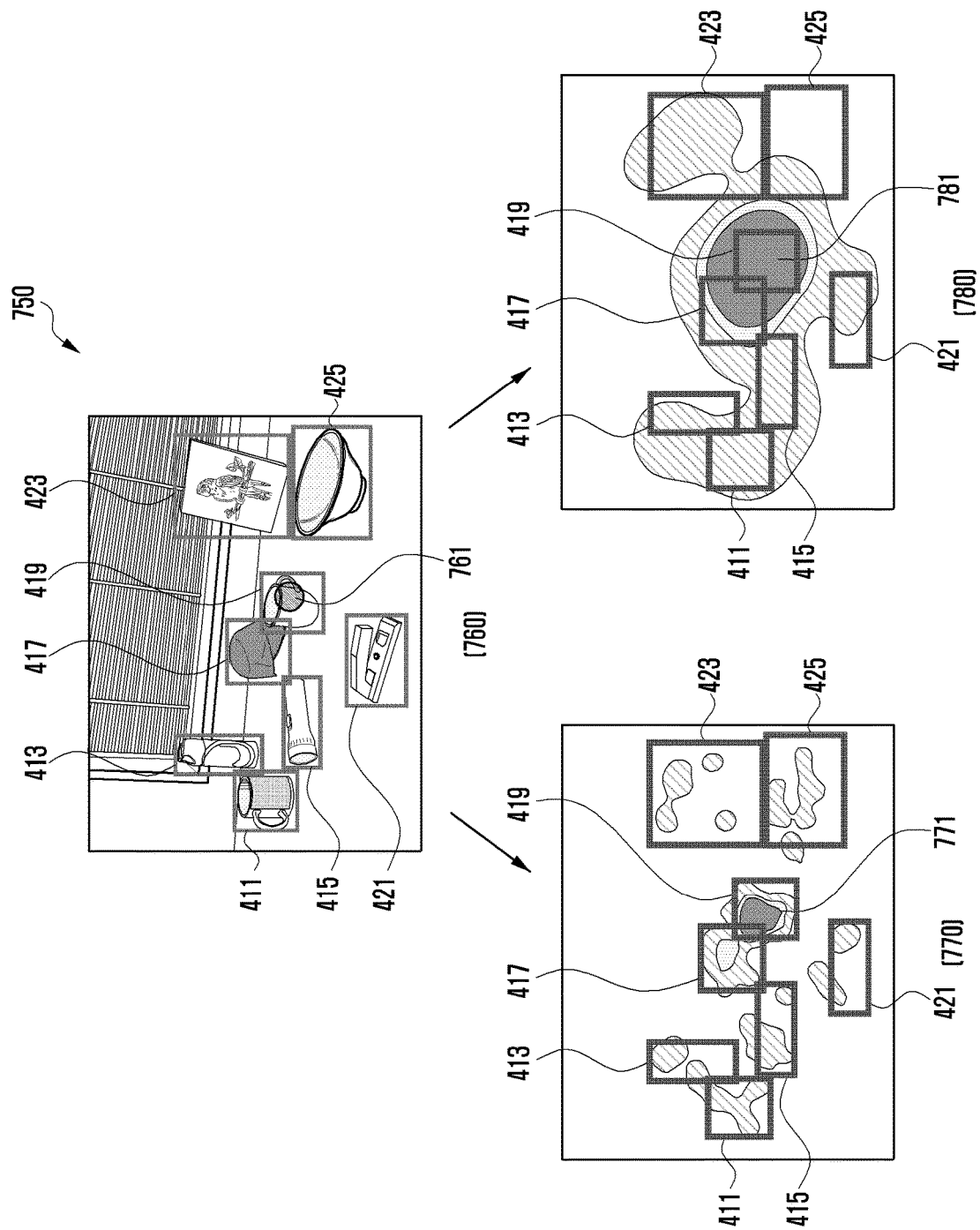

FIG. 13
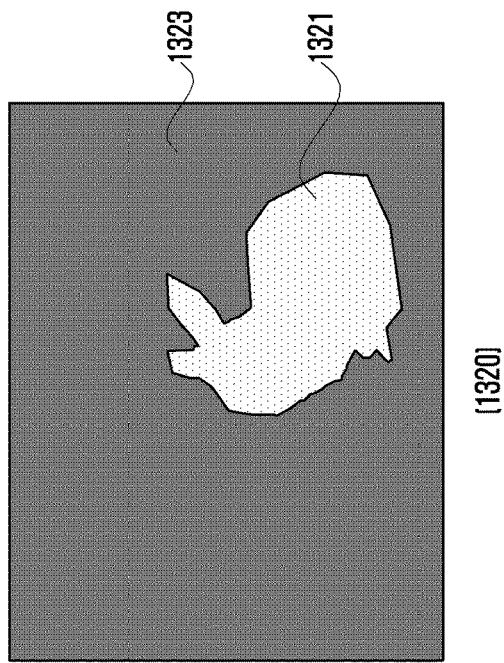
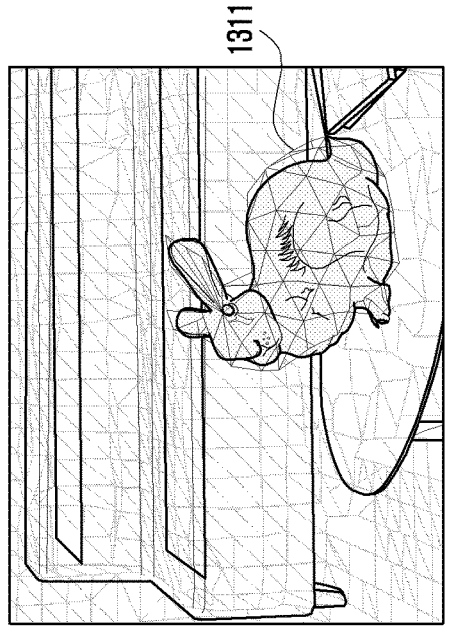
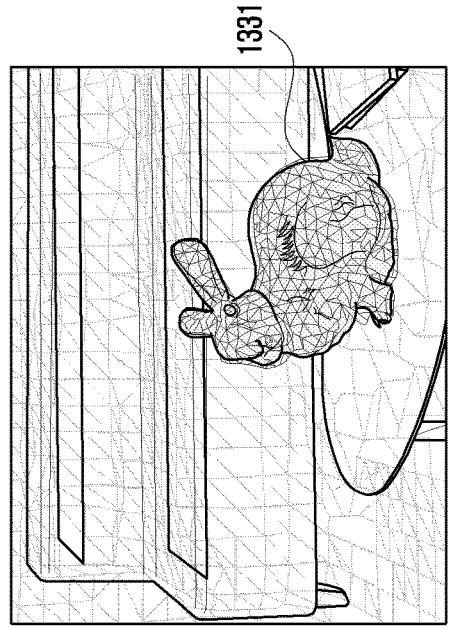

ELECTRONIC DEVICE AND METHOD FOR SPATIAL MAPPING USING THE SAME

CROSS-REFERENCE TO RELATED APPLICATION(S)

This application is a continuation of International Application No. PCT/KR2022/015264, which was filed on Oct. 11, 2022, and claims priority to Korean Patent Application No. 10-2021-0144911, filed on Oct. 27, 2021, in the Korean Intellectual Property Office, the disclosures of which are incorporated by reference herein their entirety.

BACKGROUND

Technical Field

Certain embodiments of the disclosure relate to electronic spatial mapping, and, more particular, to adjustment of spatial mapping precision based on detecting a gaze of a user.

Description of Related Art

Electronic device (e.g., consumer-grade electronic devices) increasingly provides simulated environments for users. These environments may include virtual reality (VR), in which users can have realistic experiences in virtual spaces; augmented reality (AR) in which virtual information is synthesized with real world display and/or visibility, such that the displayed virtual information is visually integrated with the real-world; mixed reality (MR) in which VR and AR display strategies are combined, and extended reality (XR) which may include VR, AR, and MR. Virtual spaces may be generated using spatial mapping technology generates three-dimensional maps for virtual environments. For example, spatial mapping technology may be expressed in terms of sets of polygons and vertices forming polygon mesh type spaces. Polygon meshes may be optimized using level-of-detail (LOD) technology, and LOD technology may be used to configure polygon size and complexity with regard to each detail level. For example, an electronic device may use LOD technology so as to pre-generate meshes having various levels of precision such that spaces may be expressed with different precisions, according to the distance between cameras and meshes, or may change spatial meshes in real time by using methods such as "edge collapse" or "vertex split."

When pre-generated meshes having various levels of detail precision are used to generate a space with different detail and precision levels, usage of a significant quantity of storage space may be necessary, and facilitating changes in the display space may be perceived as unnatural by the user due to different rendering details and precisions with regard to the display space. In addition, if meshes for the display space are changed in real-time, excessive calculation time may result because real-time calculations are utilized.

SUMMARY

An electronic device according to certain embodiments of the disclosure may render a virtual space using an adaptive spatial mapping method, based on gaze tracking and object detection technologies. For example, the electronic device may detect multiple objects from image data as acquired by one or more cameras, render an object within the tracked gaze with a higher level of detail and/or precision, and render other objects outside the tracked gaze with a lower level of precision.

An electronic device according to certain embodiments of the disclosure may include a first camera, a second camera, a display, a memory, and a processor operatively connected to the first camera, the second camera, the display, and the memory, wherein the processor is configured to acquire image data around the electronic device via the first camera, detect a plurality of objects included in the image data, detect a gaze of a user via the second camera, identify a first object corresponding to the detected gaze among the detected plurality of objects, configure a first precision for spatial mapping of the identified first object and a second precision of at least one other object from among the detected plurality of objects, wherein the first precision is higher than the second precision, execute 3-dimensional (3D) spatial mapping on the image data using the first precision for the identified first object and the second precision for the at least one other object, and display, on the display, a 3D space for the image data generated based on the executed 3D spatial mapping.

A spatial mapping method for an electronic device according to certain embodiments of the disclosure may include acquiring image data around the electronic device via a first camera; detecting, via at least one processor, a plurality of objects included in the image data; detecting a gaze of a user via a second camera; identifying a first object corresponding to the detected gaze among the detected plurality of objects; configuring a first precision for spatial mapping of the identified first object and a second precision of at least one other object from among the detected plurality of objects, wherein the first precision is higher than the second precision; executing 3-Dimensional (3D) spatial mapping on the image data using the first precision for the identified first object and the second precision for the at least one other object; and displaying, on a display, a 3D space for the image data generated based on the executed 3D spatial mapping.

An electronic device according to certain embodiments of the disclosure may track a user's gaze within a virtual environment, and render objects aligned with the tracked gaze using a higher level of detail, whereas objects disposed outside the tracked gaze are rendered using a lower level of detail. The result should save rendering and power resources while maintaining a precise and natural appearing virtual environment for the user experience.

BRIEF DESCRIPTION OF DRAWINGS

FIG. 4 illustrates a method for generating an example precision map for image data according to certain embodiments;

FIG. 5 illustrates a method for generating an example precision map for image data according to certain embodiments;

FIGS. 7A and 7B illustrate a method for configuring an example precision for image data according to certain embodiments;

FIG. 13 illustrates an example method for generating a spatial model according to certain embodiments;

DETAILED DESCRIPTION

Figure 1:
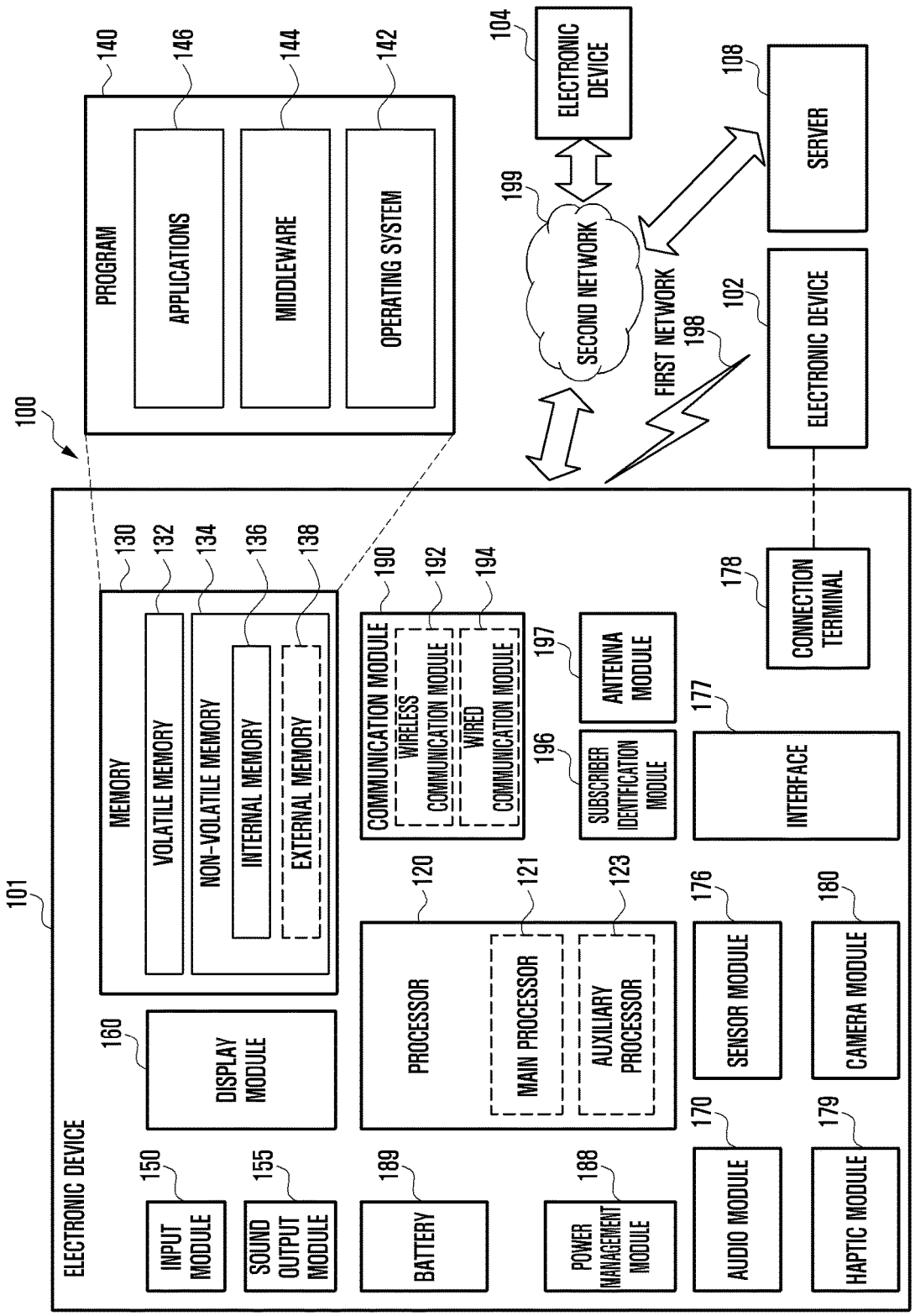
FIG. 1 is a block diagram illustrating an example electronic device in a network environment according to certain embodiments.

FIG. 1 is a block diagram illustrating an electronic device 101 in a network environment 100 according to certain embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101.

According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
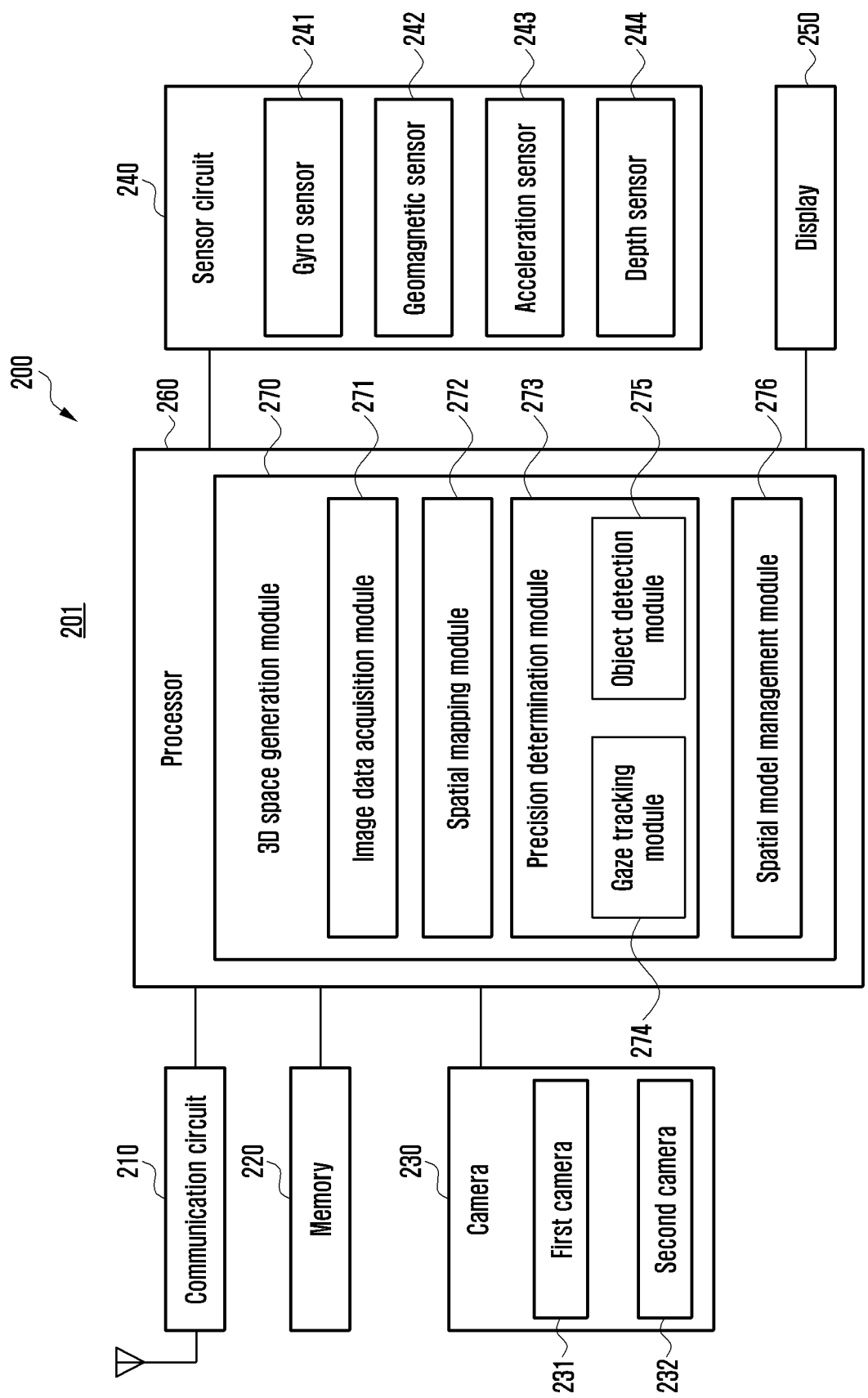
FIG. 2 is a block diagram illustrating an example electronic device according to certain embodiments.

FIG. 2 is a block diagram 200 illustrating an electronic device 201 according to certain embodiments.

Referring to FIG. 2, the electronic device 201 (e.g., the electronic device 101 of FIG. 1) may include a communication circuit 210 (e.g., the communication module 190 of FIG. 1), a memory 220 (e.g., the memory of FIG. 1), a camera 230 (e.g., the camera module 180 of FIG. 1), a sensor circuit 240 (e.g., the sensor module 176 of FIG. 1), a display 250 (e.g., the display module 160 of FIG. 1), and/or a processor 260 (e.g., the processor 120 of FIG. 1).

In certain embodiments, the communication circuit 210 (e.g., communication module 190 of FIG. 1) may support connection with an external electronic device (e.g., the electronic devices 102 and 104 and the server 108 of FIG. 1).

In certain embodiments, the memory 220 (e.g., the memory 130 of FIG. 1) may perform a function of storing a program (e.g., the program 140 of FIG. 1) for processing and controlling of the processor 260 of the electronic device 201, an operating system (OS) (e.g., the operating system 142 of FIG. 1), various applications, and/or input/output data, and may store a program for controlling the overall operation of the electronic device 201. The memory 220 may store various configuration information utilizes when the electronic device 201 processes functions related to certain embodiments of the disclosure.

In an embodiment, the memory 220 may store identification information of at least one object detected from the image data acquired using the first camera 231 and/or state information for a region of interest of the at least one object. The memory 220 may accumulate and store the user's gaze information acquired using a second camera 232 for a designated period of time. The memory 220 may store a spatial model of image data generated under the control of the processor 260.

In certain embodiments, the camera 230 (e.g., the camera module 180 of FIG. 1) may transmit the collected image to the display 250 as a preview image, so as to enable a user to identify the image acquired through the camera 230.

In an embodiment, the camera 230 may include a first camera 231 and a second camera 232. The first camera 231 may acquire image data around the electronic device 201 (e.g., an external environment around the electronic device 201) under the control of the processor 260. The second camera 232 may acquire gaze information of a user (e.g., a photographer) of the electronic device 201 and may track the user's gaze.

According to an embodiment, the camera 230 may further include an image signal processor (ISP). For example, the image signal processor may be included in at least one of the first camera 231 and the second camera 232 as an integrated module or may be included externally. According to certain embodiments of the disclosure, the image signal processor may additionally or alternatively perform some of the operations described as being performed by the processor 260 (e.g., acquiring an image through the camera 230).

Although the camera 230 is illustrated as being configured by two cameras in FIG. 2 according to certain embodiments, the disclosure is not limited thereto. For example, the camera 230 may include more than two cameras.

In certain embodiments, the sensor circuit 240 (e.g., the sensor module 176 of FIG. 1) may include a gyro sensor 241, a geomagnetic sensor 242, an acceleration sensor 243, and/or a depth sensor 244. The sensor circuit 240 may acquire movement information of the electronic device 201 (e.g., a movement direction of the electronic device 201 and a tilt of the electronic device 201) and/or depth information regarding image data acquired from the camera 230.

In an embodiment, the processor 260 may include a main processor (e.g., the main processor 121 of FIG. 1 and an application processor (AP)), and a sensor hub processor for controlling the sensor circuit 240 (e.g., the co-processor 123 of FIG. 1). For example, when the sensor hub processor is further included, a 3D space generation module 270 may be executed in the main processor, and a software module or instructions for controlling the sensor circuit 240 may be executed in the sensor hub processor. For example, the sensor hub processor may control the sensor circuit 240 to collect sensing data and transmit the collected sensing data to the main processor.

In certain embodiments, the display 250 (e.g., the display module 160 of FIG. 1) may display an image under the control of the processor 260, and may be implemented in one of a liquid crystal display (LCD), a light-emitting diode (LED) display, an organic light-emitting diode (OLED) display, a micro-electro-mechanical systems (MEMS) display, an electronic paper display, or a flexible display. However, the disclosure is not limited thereto.

In an embodiment, the display 250 may display a 3D space for image data under the control of the processor 260.

In certain embodiments, the processor 260 (e.g., the processor 120 of FIG. 1) may include, for example, a micro controller unit (MCU), and may control multiple hardware components connected to the processor 260 by driving an operating system (OS) or an embedded software program. The processor 260 may be configured to control multiple hardware components according to, for example, instructions (e.g., the program 140 of FIG. 1) stored in the memory 220.

In an embodiment, the processor 260 may include a 3D space generation module 270. The 3D space generation module 270 may include an image data acquisition module 271, a spatial mapping module 272, a detail determination module 273, a gaze tracking module 274, an object detection module 275, and/or a spatial model management module 276. For example, the 3D space generation module 270 may refer to a software module and/or a set of multiple instructions executed by the processor 260. For example, instructions included in the 3D space generation module 270 may be stored in the memory 220 and executed by the processor 260.

In an embodiment, the image data acquisition module 271 may acquire image data around the electronic device 201 by using the first camera 231. The image data acquisition module 271 may measure angular velocity and acceleration by using the sensor circuit 240, for example, the gyro sensor 241 and the acceleration sensor 243. The image data acquisition module 271 may identify the degree of movement and rotation of the electronic device 201 based on the measured angular velocity and acceleration. The image data acquisition module 271 may identify the position of the electronic device 201 in a space for image data based on the identified degree of movement and rotation of the electronic device 201.

In an embodiment, the image data acquisition module 271 may correct an integration error and an error in sensor information due to the rotation of the Earth based on sensor information acquired through the first camera 231 and the geomagnetic sensor 242.

In an embodiment, the image data acquisition module 271 may acquire multiple pieces of image data at various angles and/or positions using the first camera 231. The image data acquisition module 271 may extract a feature point from each of the acquired multiple pieces of image data and perform registration of the extracted feature points, so as to acquire depth information regarding the image data. The disclosure is not limited thereto, and the image data acquisition module 271 may acquire depth information regarding the image data by using the depth sensor 244. The depth sensor 244 may include at least one of radio detection and ranging (RADAR), light detection and ranging (LIDAR), a time of flight (ToF) camera, and an IR emitter.

In an embodiment, the spatial mapping module 272 may perform spatial mapping based on the position of the electronic device 201 and depth information regarding image data, which are received from the image data acquisition module 271. For example, the spatial mapping module 272 may perform spatial mapping by performing registration of 3D information such as multiple depth images, feature points, and point clouds with respect to image data. As another example, the spatial mapping module 272 may perform spatial mapping of the image data based on the precision map received from the precision determination module 273.

In an embodiment, the precision determination module 273 may determine a precision (e.g., mesh precision) applied in the spatial mapping process performed through the spatial mapping module 272. For example, the precision determination module 273 may generate a precision (e.g., level of detail (LOD)) map required to apply different precisions to regions of multiple objects included in image data. In an embodiment, the precision map may be configured in various forms, such as a two-dimensional or three-dimensional matrix data form, or a set of multiple two-dimensional or three-dimensional coordinates. The precision determination module 273 may transmit the generated precision map to the spatial mapping module 272.

In an embodiment, the precision determination module 273 may include a gaze tracking module 274 and/or an object detection module 275.

In an embodiment, the gaze tracking module 274 may detect the direction of the gaze from a user's face image acquired using the second camera 232. For example, the gaze tracking module 274 may calculate a point of the display 250 the user is looking at.

In an embodiment, the object detection module 275 may detect the position of at least one object from the image data acquired using the first camera 231. The object detection module 275 may allocate identification information to the at least one object.

In an embodiment, the spatial model management module 276 may manage the phase information of the spatial model and derive a final spatial mapping result. For example, the spatial model management module 276 may store and/or manage the phase information of the polygon mesh (and/or precision level information) acquired from the spatial mapping module 272. The spatial model management module 276 may generate a final spatial model by searching for precision information associated with a corresponding object from a result acquired from the gaze tracking module 274 and/or the object detection module 275.

An electronic device 201 according to various embodiments may include a first camera 231, a second camera 232, a display 250, a memory 220, and a processor 260 operatively connected to the first camera 231, the second camera 232, the display 250, and the memory 220, in which the processor 260 is configured to acquire image data around the electronic device 201 by using the first camera 231, detect multiple objects included in the image data, acquire a user's gaze information by using the second camera 232, identify an object corresponding to the acquired gaze information among the detected multiple objects, configure the precision of the identified object to be higher than the precision of at least one other object, perform 3D spatial mapping for the image data based on the precision configured in the identified object and the precision configured in the at least one other object, and display, on the display 250, a 3D space for the image data generated based on the performing of the 3D spatial mapping.

In certain embodiments, the processor 260 may be configured to generate a precision map for the image data based on the precision configured in the identified object and the precision configured in the at least one other object, and perform the 3D spatial mapping for the image data based on the generated precision map.

In certain embodiments, the processor 260 may be configured to obtain depth information of a region of each of the multiple objects detected from the image data, configure pixels included in a region configuring the identified object to have a first value, and configure pixels, which are included in a region other than the region configuring the identified object, to have a second value, based on the obtained depth information, and generate a precision map for the image data based on the configured first value and the second value.

In certain embodiments, the processor 260 may be configured to multiply location information of the identified object by the depth information of the identified object, when a value obtained by the multiplication exceeds a designated value, configure pixels included in a region configuring the shape of the identified object to have a first value, and configure pixels, which are included in a region other than the region configuring the shape of the identified object, to have a second value, and generate a precision map for the image data based on the configured first value and second value.

In certain embodiments, the processor 260 may be configured to acquire second image data around the electronic device 201 by using the first camera 231, detect multiple second objects included in the second image data, acquire the user's gaze information by using the second camera 232, identify an object corresponding to the acquired user's gaze information among the detected multiple second objects, compare the precision of the detected multiple second objects with the precision of the multiple objects included in the 3D spatial model for the image data, and when the precision of at least one object among the detected multiple second objects is identified as to be updated, based on a result of the comparison, update the precision of the at least one object.

In certain embodiments, when the precision of at least one object among the detected multiple second objects is not required for updating, based on a result of the comparison, the processor 260 may be configured to perform 3D spatial mapping for the second image data based on the precision configured in the identified object in the image data and the precision configured in the at least one other object.

In certain embodiments, the processor 260 may be configured to allocate identification information to each of the detected multiple objects, and store, in the memory 220, identification information of each of the multiple objects and state information for a region of interest of the each object.

In certain embodiments, the processor 260 may be configured to identify whether a period of time during which the user's gaze information is maintained for a region of each of the multiple objects exceeds a designated period of time, configure, as a region of interest, a region in which the period of time during which the user's gaze information is maintained exceeds the designated period of time, and not configure, as the region of interest, a region in which the period of time during which the user's gaze information is maintained is equal to or less than the designated period of time, or in which the user's gaze information is not detected.

In certain embodiments, the processor 260 may be configured to acquire the user's gaze information for a designated period of time by using the second camera 232, and accumulate the user's gaze information acquired during the designated period of time and store the accumulated user's gaze information in the memory 220.

In certain embodiments, the processor 260 may be configured to configure the size of a region centered on one point on the display 250 based on the accumulated user's gaze information, and configure the region of the configured size in the image data as a region of interest.

Figure 3:
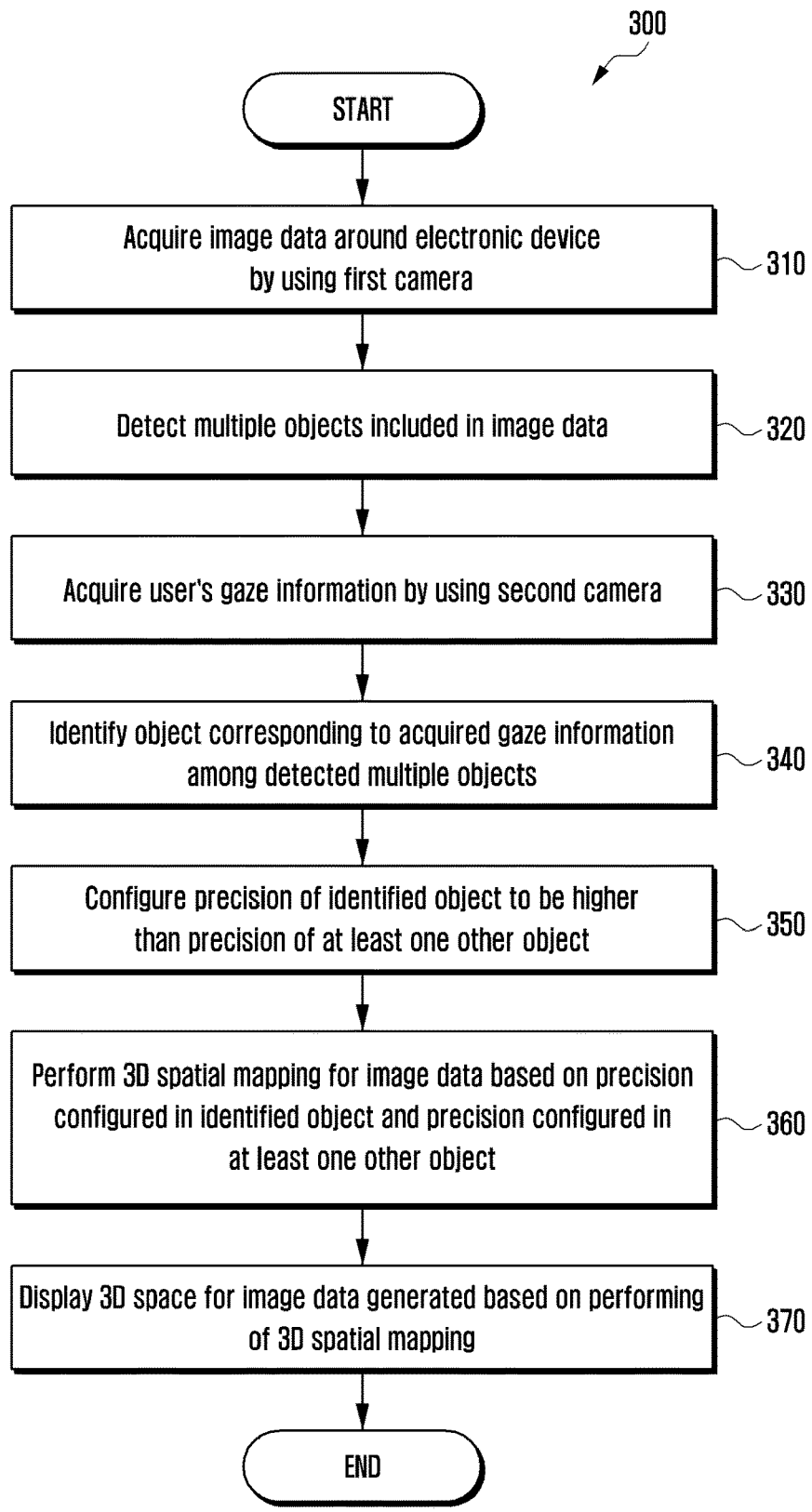
FIG. 3 is a flowchart illustrating an example spatial mapping method according to certain embodiments.

FIG. 3 is a flowchart 300 illustrating a spatial mapping method according to certain embodiments.

Referring to FIG. 3, a processor (e.g., the processor 260 of FIG. 2) (e.g., the image data acquisition module 271 of FIG. 2) of an electronic device (e.g., the electronic device 201 of FIG. 2) may be configured to acquire (or receive) image data around the electronic device 201 by using a first camera (e.g., the first camera 231 of FIG. 2) in operation 310.

In an embodiment, the processor 260 (e.g., the image data acquisition module 271 of FIG. 2) may be configured to acquire sensor information of the electronic device 201 by using a sensor circuit (e.g., the sensor circuit 240 of FIG. 2).

For example, the sensor circuit 240 may include a gyro sensor (e.g., the gyro sensor 241 of FIG. 2), a geomagnetic sensor (e.g., the geomagnetic sensor 242 of FIG. 2), an acceleration sensor (e.g., the acceleration sensor 243 of FIG. 2), and/or a depth sensor (e.g., the depth sensor 244 of FIG. 2). The processor 260 may be configured to measure the angular velocity and acceleration of the electronic device 201 by using the gyro sensor 241 and the acceleration sensor 243. The processor 260 may be configured to identify the degree of movement and rotation of the electronic device 201 based on the measured angular velocity and acceleration. The processor 260 may be configured to identify the position of the electronic device 201 in a space for image data based on the identified degree of movement and rotation of the electronic device 201.

In certain embodiments, the processor 260 (e.g., the image data acquisition module 271 of FIG. 2) may be configured to acquire multiple pieces of image data at various angles and/or positions using the first camera 231. The processor 260 (e.g., the image data acquisition module 271 of FIG. 2) may extract a feature point from each of the acquired multiple pieces of image data and perform registration of the extracted feature points, so as to acquire depth information for the image data. The disclosure is not limited thereto, and the processor 260 (e.g., the image data acquisition module 271 of FIG. 2) may be configured to acquire depth information regarding the image data using the depth sensor 244. The depth sensor 244 may include at least one of RADAR, LiDAR, a time of flight (ToF) camera, or an IR emitter.

In an embodiment, the processor 260 (e.g., the object detection module 275 of FIG. 2) may be configured to detect multiple objects included in the image data in operation 320.

In an embodiment, the processor 260 (e.g., the gaze tracking module 274 of FIG. 2) may be configured to acquire a user's gaze information by using a second camera (e.g., the second camera 232 of FIG. 2) in operation 330. For example, the processor 260 (e.g., the gaze tracking module 274 of FIG. 2) may be configured to acquire (or receive) the user's gaze information by tracking one point on a display (e.g., the display 250 of FIG. 2) that the user of the electronic device 201 gazes at.

In certain embodiments, the processor 260 (e.g., the gaze tracking module 274 of FIG. 2) may be configured to acquire the user's gaze information by using the second camera 232 for a designated period of time, and accumulate (e.g., aggregate) the acquired user's gaze information and store the same in a memory (e.g., the memory 220 of FIG. 2).

In an embodiment, in operation 340, the processor 260 may be configured to identify an object corresponding to the acquired gaze information (e.g., an object at which the user is looking), among the detected multiple objects. The disclosure is not limited thereto, and when the user's gaze information is acquired for a designated period of time, the processor 260 may be configured to identify an object corresponding to the accumulated (e.g., aggregated) user's gaze information. For example, location information of each of the multiple objects may be represented as a pair of coordinates in which an upper-left coordinate and a lower-right coordinate are paired together, in a square region including each of the multiple objects. In this case, the processor 260 may be configured to identify an object corresponding to the accumulated user's gaze information based on location information of multiple objects represented as a coordinate pair. For example, the processor 260 may be configured to identify an object disposed at a location including coordinates corresponding to the accumulated user's gaze information, as an object corresponding to the user's gaze information.

In an embodiment, the processor 260 may configure a region having a designated size, and centered on the coordinates on the display 250 corresponding to the accumulated user's gaze information, as a region in which an object is disposed that corresponds to the user's gaze information. The size of a region centered on the coordinates on the display 250 may be configured differently based on a designated condition. For example, according whether the distance between the electronic device 201, which is the target of gaze tracking, and the user of the electronic device 201 is proportional or inversely proportional thereto, or the reliability of the gaze tracking module 274, the processor 260 may be configured to configure the size of a region centered on the coordinates on the display 250 corresponding to the accumulated user's gaze information. In this regard, detailed description thereof will be provided with reference to FIGS. 7A and 7B, which will be described later.

In an embodiment, the processor 260 (e.g., the precision determination module 273 of FIG. 2) may configure a precision of the identified object to be higher than a precision of at least one other object, in operation 350. For example, the processor 260 (e.g., the precision determination module 273 of FIG. 2) may configure a precision of a region including an object identified from the image data to be higher than a precision of a region excluding the identified object.

In an embodiment, the processor 260 (e.g., the spatial mapping module 272 of FIG. 2) may perform 3D spatial mapping for image data using the precision configured with respect to the identified object, and another precision configured for at least one other object, in operation 360. For example, the processor 260 may be configured to generate a precision map for the image data based on the configured precision. The processor 260 may be configured to perform 3D spatial mapping for the image data based on the generated precision map.

In an embodiment, the processor 260 (e.g., the spatial model management module 276 of FIG. 2) may display a 3D space for image data, which is generated based on performing of 3D spatial mapping, in operation 370.

FIG. 4 is a diagram 400 illustrating a method for generating a precision map for image data according to certain embodiments.

Referring to FIG. 4, a processor (e.g., the processor 260 of FIG. 2) of an electronic device (e.g., the electronic device 201 of FIG. 2) may be configured to acquire (or receive) image data around the electronic device 201 by using a first camera (e.g., the first camera 231 of FIG. 2). The processor 260 may display the acquired image data on a display (e.g., the display 250 of FIG. 2).

In an embodiment, the processor 260 may be configured to detect multiple objects included in the image data. For example, the processor 260 may be configured to detect a first object 411, a second object 413, a third object 415, a fourth object 417, a fifth object 419, a sixth object 421, a seventh object 423, and an eighth object 425, which are included in the image data, as shown by reference numeral <410>.

In an embodiment, the processor 260 may be configured to acquire the user's gaze information 431 using a second camera (e.g., the second camera 232 of FIG. 2). The processor 260 may be configured to identify an object corresponding to the acquired user's gaze information 431, among the detected multiple objects (e.g., the first object 411 to the eighth object 425).

In FIG. 4 according to certain embodiments, the processor 260 may detect, for example, that the fifth object 419 corresponds to the user's present gaze, as per the gaze information 431.

In an embodiment, the processor 260 may set the precision of multiple objects (e.g., the first object 411 to the eighth object 425). For example, the processor 260 may set the precision of the fifth object 419 to be higher than the precision of other objects (e.g., the first object 411, the second object 413, the third object 415, the fourth object 417, the sixth object 421, the seventh object 423, and the eighth object 425), as a result of detecting that the user's gaze is directed towards the fifth object 419. For example, the processor 260 may be configured to configure a region 451 of the fifth object 419 corresponding to the user's gaze information 431 to utilize a first level of precision, and configure a region 453 different than the region 451 of the fifth object 419 to be a second level of precision, that is lower than that of the first level, as shown by reference numeral <450>. The processor 260 may be configured to generate a precision map for the image data based on the configured precision.

In another embodiment, the precision map may be represented as a two-dimensional matrix of the same size as the display 250. In this case, the processor 260 may be configured to configure pixels included in the region 451 (e.g., region of interest) of the fifth object 419 corresponding to the user's gaze information 431 to have a first value. For example, the first value may be a value of "1" for expressing a region of interest (e.g., the region 451 of the fifth object 419 corresponding to the user's gaze information 431) in white. The processor 260 may be configured to configure pixels included in the region 453 other than the region 451 of the fifth object 419 to have a second value. For example, the second value may be a value of "0" for expressing a region other than a region of interest (e.g., the region 453 other than the region 451 of the fifth object 419) in black. The processor 260 may be configured to generate a precision map for the image data based on the configured value (e.g., the first value) of pixels included in the region 451 of the fifth object 419 and the values (e.g., the second value) of pixels included in the region 453 other than the region 451 of the fifth object 419.

In another embodiment, location information of multiple objects included in image data may be represented as two-dimensional coordinates. For example, location information of each of the multiple objects may be represented as a pair of coordinates in which an upper-left coordinate and a lower-right coordinate are paired in a square region including each of the multiple objects. In this case, the precision map may be represented as a set of coordinate pairs. In FIG. 4 according to certain embodiments, in order to easily describe an embodiment in which location information of each object is displayed as a pair of coordinates, a square region including each object is shown to be displayed on the display 250, but is not limited thereto. The square region including each object may not be displayed on the display 250.

In an embodiment, the processor 260 may be configured to store information regarding the fifth object 419 (e.g., information on the region of the fifth object 419) corresponding to the user's gaze information 431 in a memory (e.g., the memory 220 of FIG. 2). For example, the information regarding the fifth object 419 (e.g., information on the region of the fifth object 419) may include identification information of the fifth object 419 and/or state information regarding a region of interest.

In certain embodiments, image data may be modeled such that a region of an object corresponding to the user's gaze information (e.g., the region of the fifth object 419), among multiple objects detected from image data, is modeled with high precision and a region except for an object region corresponding to the user's gaze information (e.g., at least one object in which a user's gaze information is not detected among a background region and/or multiple objects) is modeled with low precision, and thus the processor 260 can precisely express an object region (e.g., a region of interest) corresponding to the user's gaze information.

FIG. 5 is a diagram 500 illustrating a method for generating a precision map for image data according to certain embodiments.

In certain embodiments, it may be difficult for a user to continuously fix a gaze on one object among multiple objects included in the image data. In this case, gaze tracking detected by the gaze tracking module (e.g., the gaze tracking module 274 of FIG. 2))) may be inaccurate.

In order to prevent the above-mentioned gaze tracking from being inaccurate, in FIG. 5 according to certain embodiments, the processor 260 may be configured to identify a specific object corresponding to the accumulated user's gaze information, among multiple objects included in the image data, and may identify a period of time at which the user's gaze information is detected from the specific object, thereby configuring a region of a specific object as a region of interest.

Referring to FIG. 5, a processor (e.g., the processor 260 of FIG. 2) of an electronic device (e.g., the electronic device 201 of FIG. 2) may be configured to detect multiple objects from image data around the electronic device 201, the image data acquired using a first camera (e.g., the first camera 231 of FIG. 2). For example, the processor 260 may be configured to detect multiple objects from the image data, for example, a first object 411, a second object 413, a third object 415, a fourth object 417, a fifth object 419, a sixth object 421, a seventh object 423, and an eighth object 425, as shown by reference numeral <510>.

In an embodiment, the processor 260 may be configured to allocate identification information to each of the detected multiple objects, for example, the first object 411, the second object 413, the third object 415, the fourth object 417, the fifth object 419, the sixth object 421, the seventh object 423, and the eighth object 425. For example, the processor 260 may be configured to allocate identification information "ID 0" to the first object 411, allocate identification information "ID 1" to the second object 413, allocate identification information "ID 2" to the third object 415, allocate identification information "ID 3" to the fourth object 417, allocate identification information "ID 4" to the fifth object 419, allocate identification information "ID 5" to the sixth object 421, allocate identification information "ID 6" to the seventh object 423, and allocate identification information "ID 7" to the eighth object 425.

However, the disclosure is not limited thereto, and the processor 260 may be configured to configure state information regarding a region of interest together with the identification information of each object. For example, the state information regarding a region of interest may be determined based on a period of time during which the user's gaze stays on a region including each object. For example, the state information regarding a region of interest may include a first state and a second state. The first state may refer to a state in which a region including each object is configured as a region of interest based on identification that a period of time during which the user's gaze stays on a region including each object exceeds a designated period of time. The second state may refer to a state in which a region including each object is not configured as a region of interest based on identification that the user's gaze on a region including each object is not detected or that a period of time during which the user's gaze stays on is equal to or less than a designated period of time.

In an embodiment, when image data around the electronic device 201 is acquired using the first camera 231, state information of multiple objects included in the image data may be initialized to a second state, for example, a state that is not configured as a region of interest. In this case, the processor 260 may be configured to map the state information regarding the region of interest, for example, the second state together with identification information of each object, and may store the same in a memory (e.g., the memory 220 of FIG. 2).

In an embodiment, the processor 260 may be configured to acquire the user's gaze information using a second camera (e.g., the second camera 232 of FIG. 2).

In an embodiment, the processor 260 may be configured to identify a specific object, for example, the fifth object 419 corresponding to the user's gaze information (e.g., the user's gaze information 431 of FIG. 4), among the detected multiple objects. The processor 260 may be configured to identify a period of time at which the user's gaze information is detected from the fifth object 419 (e.g., a period of time during which the user's gaze is maintained), and may determine whether the identified period of time at which the gaze information is detected exceeds a designated period of time. When the identified period of time at which the gaze information is detected exceeds the designated period of time, the processor 260 may be configured to change the state information regarding the fifth object 419. For example, the processor 260 may be configured to change the state of the fifth object 419 to the first state from the second state. In other words, the processor 260 may be configured to configure the region of the fifth object 419 as a region of interest. In this case, the processor 260 may be configured to change the state information (e.g., second state), which is mapped to the identification information (e.g., "ID 4") of the fifth object 419 and stored, to the first state for example and store the same in the memory 220.

In an embodiment, the processor 260 may be configured to generate a precision map for image data based on a region configured as a region of interest (e.g., the region of the fifth object 419) and a region not configured as a region of interest (e.g., a region other than the region of the fifth object 419) in the image data.

In an embodiment, the processor 260 may be configured to acquire the user's gaze information by using the second camera 232 at designated time intervals in a state in which the region of the fifth object 419 is configured as a region of interest. The processor 260 may be configured to identify whether the user's gaze information is continuously detected in the region of the fifth object 419 configured as a region of interest, based on the user's gaze information acquired at designated time intervals.

In FIG. 5 according to certain embodiments, description will be made under an assumption that the user's gaze information, which previously indicated the fifth object 419, is now detected as directed to the fourth object 417.

In an embodiment, as a result of acquiring the user's gaze information at designated time intervals, in case that the user's gaze information 511 indicates attention is now on the fourth object 417, and has been maintained upon the fourth object 417 for a certain period of time that exceeds a designated period of time, the processor 260 may be configured to change the state information of the fourth object 417. For example, the processor 260 may be configured to change the state of a region including the fourth object 417 from a state in which the region is not set as a region of interest (e.g., a second state) to a state in which the region is set as a region of interest (e.g., a first state). In this case, the processor 260 may be configured to change the state information (e.g., a second state), which is mapped to the identification information (e.g., "ID 3") of the fourth object 417 and stored, to the first state for example and store the same in the memory 220.

In an embodiment, as seen on view <550> as the user's gaze information 511 is detected upon the fourth object 417, a region configured as a region of interest may include two regions, for example, a region 553 of the fourth object 417 and a region 551 of the fifth object 419. As the region 553 of the fourth object 417 and the region 551 of the fifth object 419 are configured as a region of interest, the processor 260 may be configured to configure the values of pixels included in the region 553 of the fourth object 417 and the values of pixels included in the region 551 of the fifth object 419 to have a first value, as shown by reference numeral <450>. For example, the first value may be a value of "1" for expressing a region of interest (e.g., the region 553 of the fourth object 417 and the region 551 of the fifth object 419) in white. The processor 260 may be configured to configure the values of pixels included in a region 555 other than the region 553 of the fourth object 417 and the region 551 of the fifth object 419 to have a second value. For example, the second value may be a value of "0" for expressing a region other than a region of interest (e.g., the region 555 other than the region 553 of the fourth object 417 and the region 551 of the fifth object 419) in black. The processor 260 may be configured to generate a precision map for the image data based on the configured pixel values, for example, the first value and the second value.

In an embodiment, as the user's gaze information detected as changing from the fifth object 419 to the fourth object 417, the user's gaze information may no longer be detected in the region 551 of the fifth object 419 previously configured as a region of interest, or a period of time during which the user's gaze is maintained on the fifth object 419 may be equal to or less than a designated period of time. Here, the processor 260 may be configured to change the state information of the fifth object 419. For example, the processor 260 may be configured to change the state of the region 551 of the fifth object 419 to a state in which the region is not configured as a region of interest (e.g., a second state). Here, the processor 260 may be configured to change the state information (e.g., a first state), which is mapped to the identification information (e.g., "ID 4") of the fifth object 419 and stored, to a second state for example and store the same in the memory 220.

In an embodiment, as the state of the region 551 of the fifth object 419 changes to a state in which the region is not configured as a region of interest, the processor 260 may set the values of pixels included in the region 551 of the fifth object 419 to have the second value, away from the first value. The processor 260 may be configured to update the precision map for the image data based on the changed values of pixels included in the region 551 of the fifth object 419.

In an embodiment, the state information of each object may be expressed in the form of a predetermined value, and the level of precision may be determined based on a predetermined value. The processor 260 may be configured to generate a precision map for the image data based on the level of precision. For example, in case that the state information of the object has a real value between 0 and 100 and the precision level can be expressed as a fourth levels, the processor 260 may be configured such that an object having the degree of interest falling within a first range (e.g., less than 25) has a first level of precision; an object having the degree of interest falling within a second range (e.g., 25 or more and less than 50) has a second level of precision; an object having the degree of interest falling within a third range (e.g., 50 or more and less than 75) has a third level of precision; and an object having the degree of interest falling within a fourth range (e.g., 75 or more) has a fourth level of precision. For example, the higher the degree of interest, the higher the precision level may be, and accordingly, the region of high degree of interest may be precisely expressed in the image data.

Figure 6:
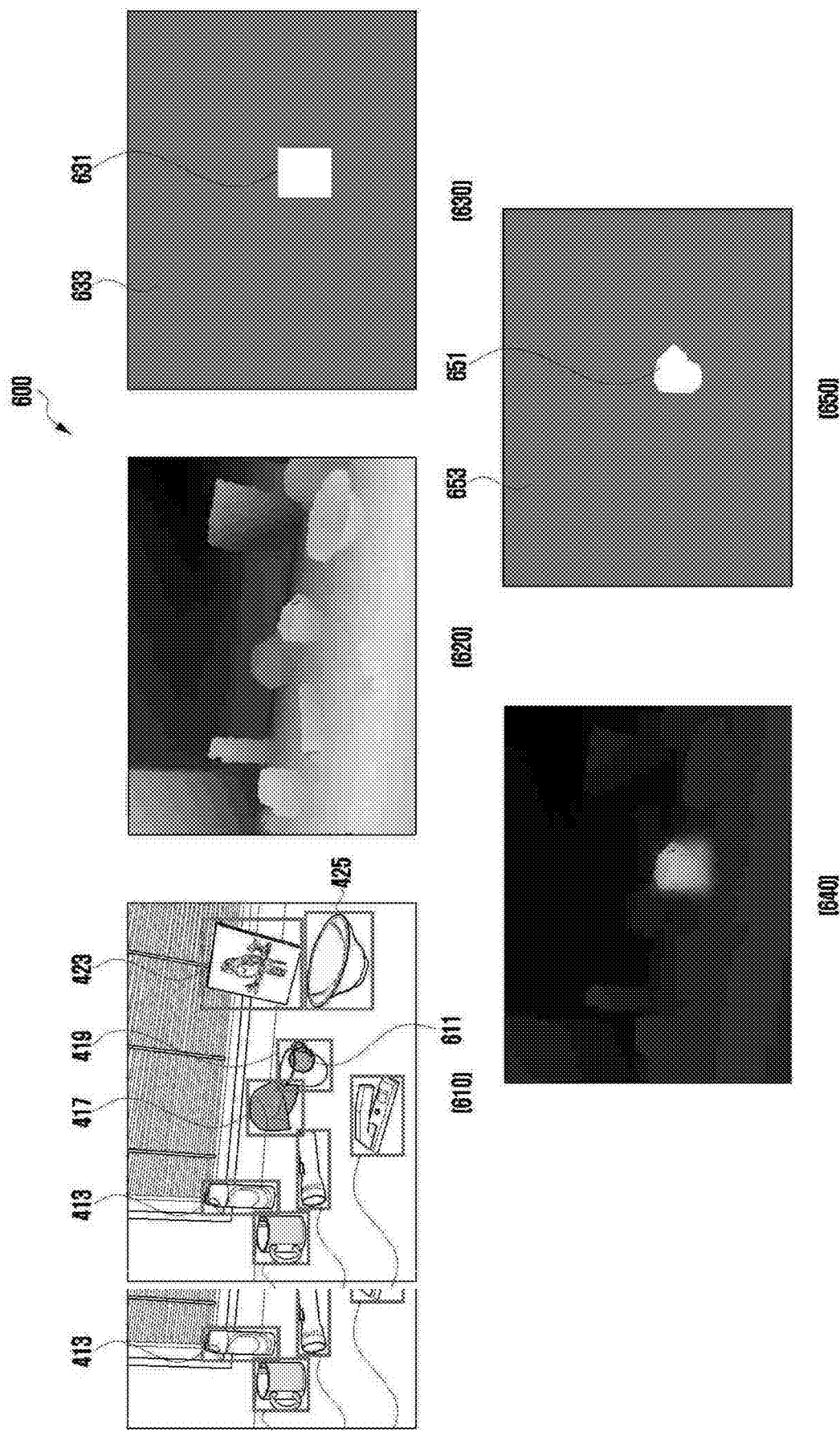
FIG. 6 illustrates a method for generating an example precision map for image data according to certain embodiments.

FIG. 6 is a diagram 600 illustrating a method for generating a precision map for image data according to certain embodiments.

Referring to FIG. 6, as shown by reference numeral <610>, a processor (e.g., the processor 260 of FIG. 2) of an electronic device (e.g., the electronic device 201 of FIG. 2) may be configured to detect multiple objects from image data around the electronic device 201, the image data acquired using a first camera (e.g., the first camera 231 of FIG. 2). For example, the processor 260 may be configured to detect multiple objects from the image data, for example, a first object 411, a second object 413, a third object 415, a fourth object 417, a fifth object 419, a sixth object 421, a seventh object 423, and an eighth object 425, as shown by reference numeral <610>.

In an embodiment, the processor 260 may be configured to acquire the user's gaze information using a second camera (e.g., the second camera 232 of FIG. 2). The processor 260 may be configured to identify an object corresponding to the acquired user's gaze information 611, for example, a fifth object 419, from among the detected multiple objects (e.g., the first object 411 to the eighth object 425).

In certain embodiments, the processor 260 may be configured to acquire multiple pieces of image data at various angles and/or positions using the first camera 231. The processor 260 may be configured to extract a feature point from each of the acquired multiple pieces of image data and perform registration of the extracted feature points, so as to acquire depth information regarding the image data. The disclosure is not limited thereto, and the processor 260 may be configured to acquire depth information regarding the image data by using the depth sensor 244 (e.g., at least one of RADAR, LiDAR, a ToF camera, and an IR emitter). As the depth information is acquired, the position of each object in the image data may be accurately expressed.

In an embodiment, as shown by reference numeral <620>, each pixel of the image data acquired using the first camera 231 may correspond to a respective pixels of a depth image according to depth information of image data. The processor 260 may be configured to obtain depth information of each object region from the image data. In an embodiment, considering that a pixel, which is within a designated distance from the electronic device 201 in the image data, has a high probability of defining a corresponding object, the detailed shape of the object may be identified based on a pixel disposed within a designated distance from the electronic device 201. The processor 260 may be configured such that pixels, which are included in a region 631 configuring the shape of the corresponding object in the image data, have a first value, and that pixels, which are included in a region 633 other than the region 631 configuring the shape of the object, have a second value. For example, the first value may be a value of "1" to be expressed in white, and the second value may be a value of "0" to be expressed in black. However, the disclosure is not limited thereto. The processor 260 may be configured to generate a precision map for image data based on values of pixels included in the configured regions 631 and 633, as shown by reference numeral <630>. For example, the processor 260 may be configured to generate a precision map by configuring a different pixel value for each region of each object with regard to image data, and applying a different precision to each region of each object based on the configured pixel values.

For another example, as shown by reference numeral <640>, the processor 260 (e.g., the object detection module 275 of FIG. 2) may be configured to multiply location information of the detected object (e.g., the location information of the object described in FIG. 4 (e.g., location information expressed as a pair of coordinates in which the upper-left and lower-right coordinates are paired in a square region including each object) by the depth information. The processor 260 may be configured to identify whether the value obtained by multiplication exceeds a designated value. When the value obtained by multiplication exceeds a designated value, the processor 260 may set pixels included in a region 651 configuring the shape of the fifth object 419 to have a first value, and pixels included in a region 653 other than the region 651 configuring the shape of the fifth object 419 to have a second value. The processor 260 may generate a precision map for the image data based on the values of the pixels included in the configured regions 651 and 653, as shown by reference numeral <650>.

In certain embodiments, as shown by reference numeral <650>, a precision map generated based on the values of pixels, which are obtained by multiplying location information of an object by depth information and configured according to whether the value obtained by multiplication exceeds a designated value may acquire a more detailed shape with regard to the fifth object 419, as compared to a precision map generated based on the values of pixels, which are configured according to whether an object is within a designated distance from the electronic device 201 as shown by reference numeral <630> (e.g., a shape close to a cup that is the fifth object 419).

In certain embodiments, although not shown, a distance between each of the multiple objects detected from image data and the electronic device 201 may be calculated based on depth information. For example, as described above with reference to FIG. 5, when identification information is allocated to each object, the processor 260 may be configured to calculate the distance between each of the multiple objects and the electronic device 201 based on a region and depth information of each object. For example, the processor 260 may be configured to configure a representative value of depth information in a region of each object as a distance between each object and the electronic device 201. For example, the representative value may be an average value, a median value, or a mode value calculated based on depth information of a region of each object.

In an embodiment, when an object corresponding to the user's gaze information 611, for example, a region including the fifth object 419, among the multiple objects is identified as a region of interest, the processor 260 may be configured to calculate a precision based on the distance between the electronic device 201 and the fifth object 419. For example, if the spatial mapping module (e.g., the spatial mapping module 272 of FIG. 2) supports three levels of precision (e.g., a first level, a second level, and a third level), the processor 260 may be configured to configure the precision level of an object, which is located at a distance of a first range from the electronic device 201, to be a first level, may configure the precision level of an object, which is located at a distance of a second range greater than the first range, to be a second level, and may configure the precision level of an object, which is located at a distance of a third range greater than the second range, to be a third level. The electronic device 201 may generate a precision map based on the configured level of precision. For example, the precision may increase in the order of the first level, the second level, and the third level, the first level being lowest and the third level being the highest.

FIGS. 7A and 7B are diagrams 700 and 750 illustrating a method for configuring a precision for image data, respectively, according to certain embodiments.

FIGS. 7A and 7B according to certain embodiments are diagrams illustrating a method for configuring a region of interest for a specific object based on a result of performing gaze tracking and configuring a precision based on the configured region of interest.

In certain embodiments, it may be difficult for a user to continuously fix a gaze on one object among multiple objects included in the image data. In this case, gaze tracking detected by the gaze tracking module (e.g., the gaze tracking module 274 of FIG. 2) may be inaccurate.

Referring to FIG. 7A, a processor (e.g., the processor 260 of FIG. 2) of an electronic device (e.g., the electronic device 201 of FIG. 2) may be configured to detect multiple objects from image data around the electronic device 201, the image data acquired using a first camera (e.g., the first camera 231 of FIG. 2). For example, the processor 260 may be configured to detect multiple objects from the image data, for example, a first object 411, a second object 413, a third object 415, a fourth object 417, a fifth object 419, a sixth object 421, a seventh object 423, and an eighth object 425, as shown by reference numeral <710>.

In an embodiment, the processor 260 may be configured to acquire the user's gaze information using the second camera 232 for a designated period of time, and may accumulate and store the acquired user's gaze information in a memory (e.g., the memory 220 of FIG. 2)). The processor 260 may be configured to configure, as a region of interest, a region of an object corresponding to the accumulated user's gaze information in the image data.

Reference numerals <720> and <730> according to certain embodiments are diagrams in which a user's gaze information detected by the gaze tracking module 274 is visualized in the form of a heat map. For example, the heat maps shown in reference numbers <720> and <730> according to certain embodiments are visualized in the form of shading and hatching, but in actual implementation, the heat map may be an image map in which a number of a specific range (e.g., 0 to 1) for each pixel is displayed. The heat map as described above may have a same size as the input image resolution, or have a different size (e.g., about ½ or about ¼ size) from the input image resolution, and may be stored in the memory 220 for usage.

In an embodiment, the processor 260 may be configured to identify a region of an object corresponding to a user's gaze information 711, such as, for example, the region of the fifth object 419 in the image data, as shown by reference numeral <720>. The region of the fifth object 419, in which the user's gaze information 711 is detected, may be expressed in a first visualization shape 721 (e.g., a visualization shape in which the region of the fifth object 419 is filled) on the heat map. For example, expressing of the first visualization shape 721 in the heat map may reference a count of a number of times that the user's gaze is detected upon the fifth object 419 exceeding a predesignated count. For another example, in the heat map, a second visualization shape 723 (e.g., a visualization shape in which a region is filled with dots), a third visualization shape 725 (e.g., a visualization shape in which a region is filled with hatching), a fourth visualization shape 727 (e.g., a visualization shape having an unfilled region) may reference areas for which a count of gaze directions to those respective locations is equal to or less than, or that the user's gaze information is not detected.

In an embodiment, as shown by reference numeral <730>, the processor 260 may be configured to configure, based on the user's gaze information that is accumulated over a designated period of time, the size of a region centered on one point (e.g., coordinates) on the display 250 corresponding to the accumulated user's gaze information, so as to identify a region of an object corresponding to the accumulated gaze information. For example, a higher accumulated value may be determined when the gaze information is detected at the center of the circle and at a point closer to the center of the circle, and a lower accumulated value may be determined as the user's gaze information is detected at a point farther from the center of the circle. For example, a region of the fifth object 419 in which the accumulated user's gaze information is detected may be expressed in a first visualization shape 731 (e.g., a visualization shape in which a region of the fifth object 419 is filled) in the heat map. For another example, a region in which the number of times of detection of the accumulated user's gaze information is equal to or less than the designated number of times, or in which the user's gaze information is not detected, may be expressed as a second visualization shape 733 (e.g., a visualization shape in which a region is filled with dots), a third visualization shape 735 (e.g., a visualization shape in which a region is filled with hatching), a fourth visualization shape 737 (e.g., a visualization shape having an unfilled region) in the heat map.

In an embodiment, it may be identified that the size of a region expressed as the first visualization shape 731 shown by reference numeral <730> is larger than the size of the region expressed as the first visualization shape 721 shown by reference numeral <720>. Compensation for gaze tracking inaccuracy may be at least partly implemented by accumulating the detected user's gaze information for a designated period of time, and configuring a region of an object corresponding thereto as a region of interest (e.g., expressed in a first visualization shape).

In certain embodiments, the processor 260 may be configured to express, in a first visualization shape, a region of a designated size centered on one point (e.g., coordinates) on the display 250 corresponding to the user's gaze information. In an embodiment, the designated size of the region expressed in the first visualization shape may be configured differently based on whether the distance between the electronic device 201, which is the target of gaze tracking, and the user of the electronic device 201 is proportional or inversely proportional thereto. For example, when the user's face closes to the electronic device 201, the processor 260 may be configured to identify that the user is intensively looking at a specific object among multiple objects included in the image data, and configure a region centered on one point (e.g., coordinates) on the display 250 corresponding to the user's gaze information to be a first size, so as to express the region in a first visualization shape. As another example, when the user's face is farther away from the electronic device 201, the processor 260 may be configured to identify that the user is looking at multiple objects included in the image data, and configure a region centered on one point (e.g., coordinates) on the display 250 corresponding to the user's gaze information to be a second size larger than the first size, so as to express the region in a first visualization shape.

The disclosure is not limited thereto, and the designated size of a region expressed in the first visualization shape may be configured differently depending on the reliability of the gaze tracking module 274. For example, the reliability of gaze tracking may refer to a probability in which a point on the display 250 corresponding to the user's gaze information corresponds to a point actually viewed by a user. The reliability of gaze tracking may include a first reliability level and a second reliability level. For example, the first reliability level is "high", which refers to that a probability in which a point on the display 250 corresponding to the user's gaze information corresponds to a point actually viewed by the user is relatively high (e.g., refers to that a distance between a point on the display detected by the gaze tracking module 274 and a point on the display 250 corresponding to the user's gaze information is relatively short, and thus a small error occurs). For another example, the second reliability level is "low", which refers to that a probability in which a point on the display 250 corresponding to the user's gaze information corresponds to a point actually viewed by the user is relatively low (e.g., refers to that a distance between a point on the display detected by the gaze tracking module 274 and a point on the display 250 corresponding to the user's gaze information is relatively long, and thus a large error occurs). However, the disclosure is not limited thereto. In an embodiment, the reliability of gaze tracking may be automatically calculated, configured by a user, or configured as a default value.

In an embodiment, when it is identified as the first reliability level (e.g., high reliability) based on the reliability of the gaze tracking module 274, the processor 260 may configure a region centered on a point (e.g., coordinates) on the display 250 corresponding to the user's gaze information to be a first size and express the same in a first visualization shape. As another example, in case that the user's face is farther away from the electronic device 201, when it is identified as the second reliability level (e.g., low reliability) based on the reliability of the gaze tracking module 274, the processor 260 may configure a region centered on a point (e.g., coordinates) on the display 250 corresponding to the user's gaze information to be a second size, which is greater than the first size, and express the same in a first visualization shape, thereby partially compensate for the inaccuracy of gaze tracking.

Referring to FIG. 7B, as shown by reference numeral <760>, the processor 260 may be configured to detect multiple objects from image data around the electronic device 201, the image data acquired using the first camera 231. For example, the processor 260 may be configured to detect multiple objects from the image data, for example, a first object 411, a second object 413, a third object 415, a fourth object 417, a fifth object 419, a sixth object 421, a seventh object 423, and an eighth object 425.

In an embodiment, the processor 260 may be configured to acquire the user's gaze information 761 using the second camera 232 for a designated period of time.

Reference numerals <770> and <780> according to certain embodiments are diagrams in which gaze information detected by the gaze tracking module 274 is visualized in the form of a heat map. For example, the heat maps shown in reference numerals <770> and <780> according to certain embodiments are visualized in the form of shading and hatching.

In an embodiment, the processor 260 may configure a region corresponding to the user's gaze information in the image data based on an accumulated value based on the number of times of detection of the user's gaze information accumulated for a designated period of time with regard to a specific object, or a total of the accumulated values, instead of a period of time during which the user's gaze is maintained on a specific object among multiple objects included in the image data. For example, as shown in reference numerals <770> and <780>, the processor 260 may be configured to identify the status information regarding a region of the corresponding object, based on the accumulated value based on the number of times of detection of the user's gaze information in a region (e.g., a square region) including each object, or a total (or average value) of the accumulated values.

For example, based on expressing a region of a specific object (e.g., the region of the fifth object 419 in reference numerals <770> and <780>) as the first visualization shapes 771 and 781) (e.g., a visualization shape in which the region of the fifth object 419 is filled) based on the accumulated value based on the number of times of detection of the user's gaze information in a region (e.g., a square region) including each object in the heat map, or a total (or average value) of the accumulated values, it may be identified that the region of the fifth object 419 corresponding to the user's gaze information is configured as a region of interest.

Figure 8:
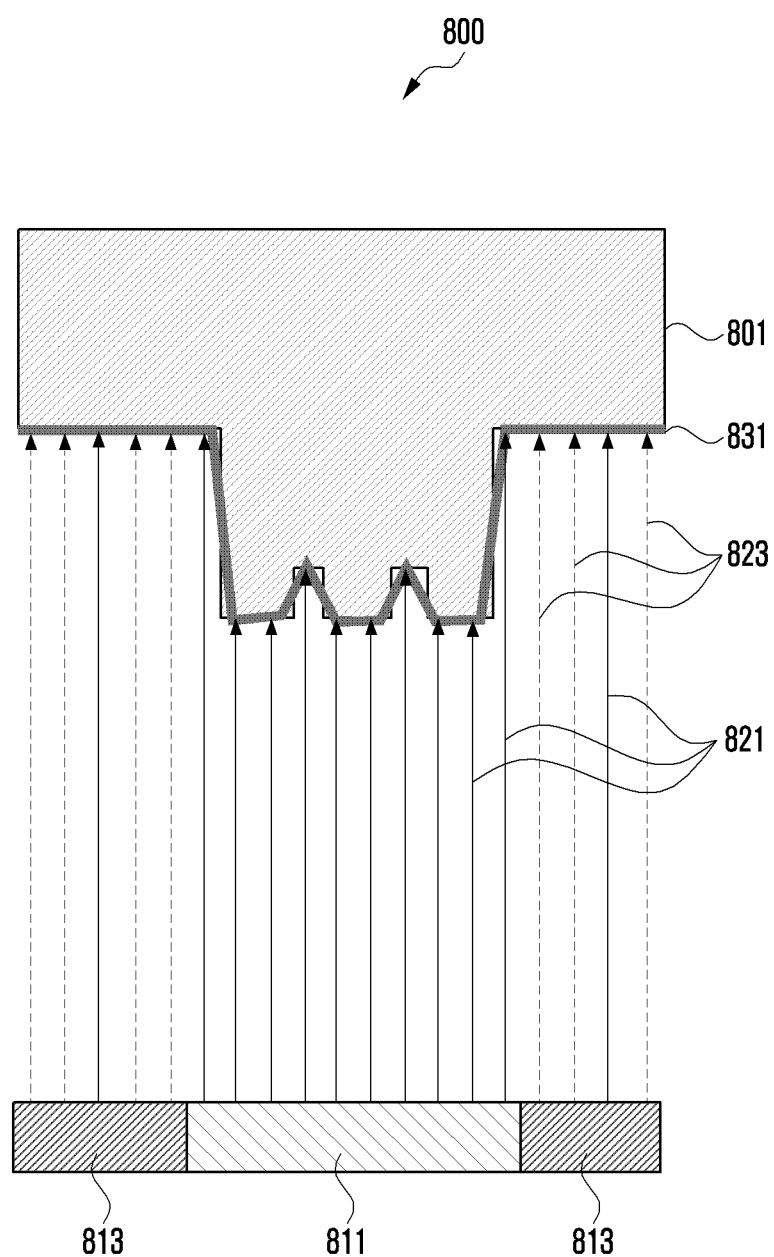
FIG. 8 illustrates a method for performing spatial mapping according to certain example embodiments.

FIG. 8 is a diagram 800 illustrating a method for performing spatial mapping according to certain embodiments.

Referring to FIG. 8, a processor (e.g., the processor 260 of FIG. 2) of an electronic device (e.g., the electronic device 201 of FIG. 2) may display image data including an object 801 acquired using a first camera (e.g., the first camera 231 of FIG. 2) on a display (e.g., the display 250 of FIG. 2).

In an embodiment, the first region 811 may refer to a region corresponding to the user's gaze information in the image data. For example, the processor 260 may set a higher precision level for a first region 811 corresponding to the user's gaze information in the image data. Configuring the precision to be higher may refer to expressing the first region 811 more precisely than other regions (e.g., a second region 813) with lower precision levels.

In an embodiment, the second region 813 may refer to a region in which the user's gaze information is not detected with respect the image data. For example, the processor 260 may configure the precision level of a second region 813 in which the user's gaze information is not detected in the image data to be lower than the higher precision level of the first region 811.

In an embodiment, a solid arrow 821 shown in FIG. 8 may indicate depth information used in spatial mapping, and a dotted arrow 823 may indicate depth information not used in spatial mapping.

In FIG. 8 according to certain embodiments, the processor 260 may be configured to perform spatial mapping of the first region 811 corresponding to the user's gaze information in the image data by using a high precision level and depth information according to the solid arrow 821, and may perform spatial mapping of the second region 813 using a low precision level and depth information according to the solid arrow 821. Accordingly, the processor 260 may be configured to perform spatial mapping of the first region 811 more precisely than that of the second region 813. The processor 260 may be configured to generate a spatial model 831 of the object 801 based on performing of spatial mapping.

Figure 9:
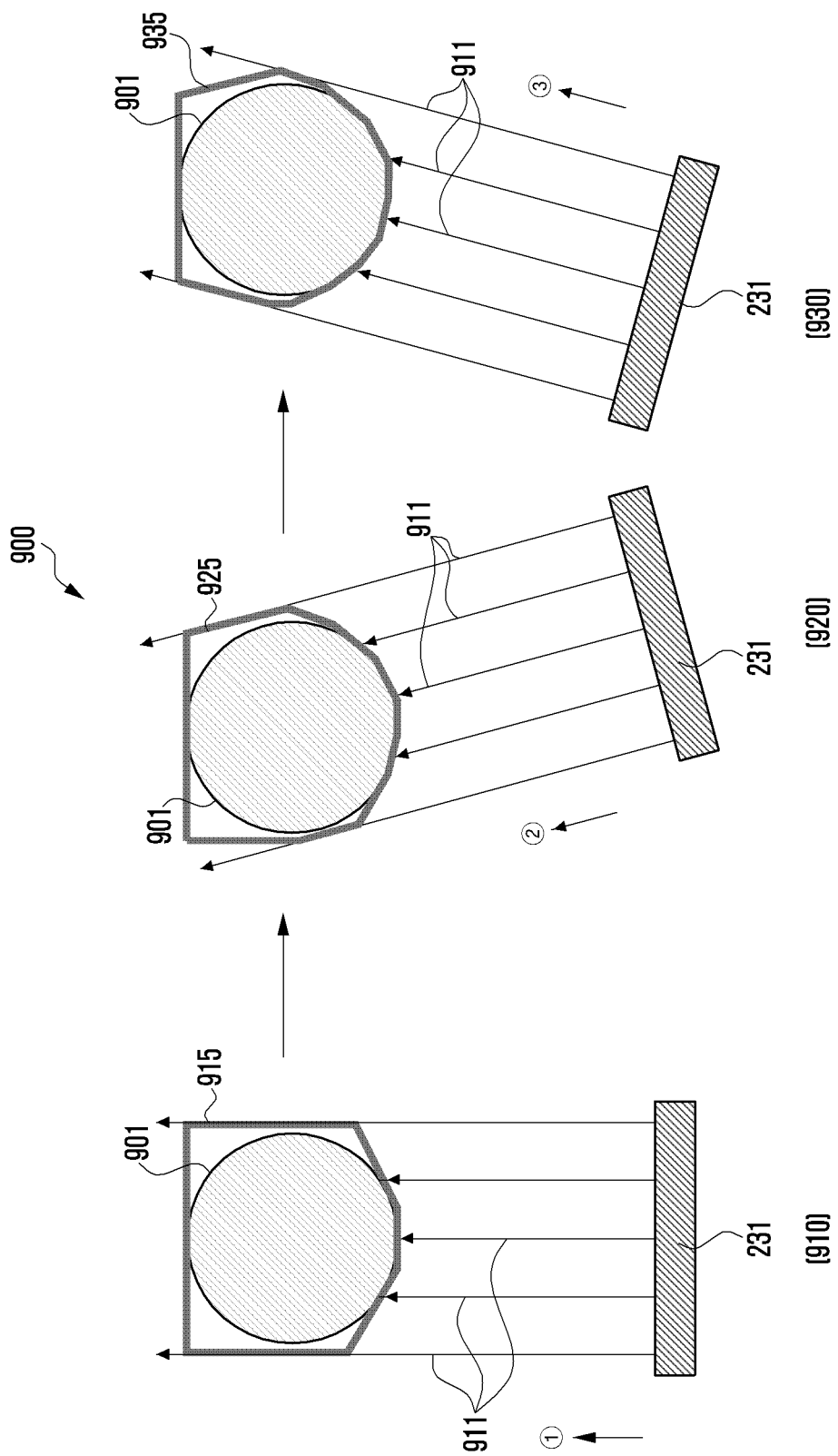
FIG. 9 illustrates an example method for performing spatial mapping according to certain embodiments.

FIG. 9 is a diagram 900 illustrating a method for performing spatial mapping according to certain embodiments.

FIG. 9 according to certain embodiments is a diagram illustrating space carving among spatial mapping techniques.

Referring to FIG. 9, a processor (e.g., the processor 260 of FIG. 2) of an electronic device (e.g., the electronic device 201 of FIG. 2) may be configured to acquire image data using a first camera (e.g., the first camera 231 of FIG. 2). The processor 260 may be configured to detect a circular object 901 from the image data, and acquire depth information of the detected circular object 901 (e.g., a target of spatial mapping). For example, the arrows 911 shown in FIG. 9 may indicate depth information.

In an embodiment, the processor 260 may be configured to calculate a distance between the electronic device 201 and the circular object 901 based on depth information for the circular object 901. The processor 260 may configure the resolution of a depth map for the circular object 901 based on the calculated distance between the electronic device 201 and the circular object 901.

In an embodiment, reference numeral <915> may indicate a result of spatial mapping when the electronic device 201 is directed at the circular object 901 in a first direction ①. Reference numeral <925> may indicate a result of spatial mapping when the electronic device 201 is directed at the circular object 901 in a second direction ② different from the first direction ①. Reference numeral <935> may indicate a result of spatial mapping when the electronic device 201 is directed at the circular object 901 in a third direction ③ different from the second direction ②. As a result of the spatial mapping, a spatial model 915 having a shape close to a square as shown by reference numeral <910> may be generated. However, as the circular object 901 is viewed at various directions (or various angles), spatial models 925 and 935 having a shape close to a circle, such as reference numerals <920> and <930>, may be generated.

Figure 10:
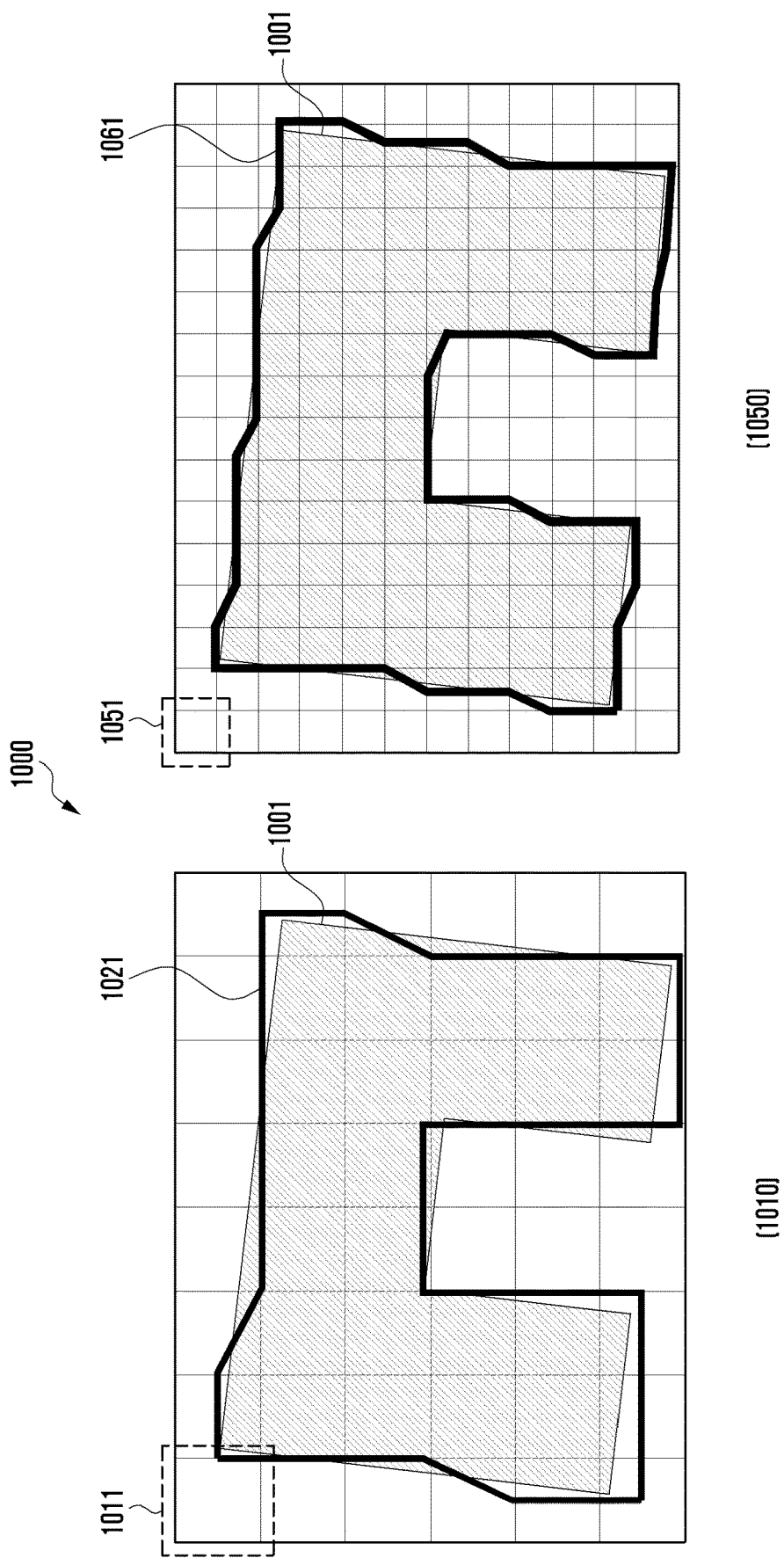
FIG. 10 illustrates an example method for performing spatial mapping according to certain embodiments.

FIG. 10 is a diagram 1000 illustrating a method for performing spatial mapping according to certain embodiments.

Referring to FIG. 10, squares 1011 and 1051 shown in reference numerals <1010> and <1050> respectively, may include nine virtual points including four vertices, the midpoint of four sides, and one point in the middle of the square. In addition, spatial mapping may be performed by connecting two points (or three points in a case of including a midpoint) among nine virtual points in each of the squares 1011 and 1051. However, the disclosure is not limited thereto.

Reference numeral <1010> according to an embodiment is a diagram in which spatial mapping of an object 1001 is performed based on a first level of precision (e.g., mesh precision), and reference numeral <1050> is a diagram in which spatial mapping of the object 1001 is performed based on a second level of precision (e.g., mesh precision).

In an embodiment, the first level of precision according to reference numeral <1010> may be lower than the second level of precision according to reference numeral <1050>. In an embodiment, the precision may be classified based on the size of the square and the number of squares. The size of the square and the number of squares may indicate the degree of subdivision for the same area. For example, as the size of the square decreases and the number of squares increases, the degree of subdivision (e.g., precision) may increase. A high degree of subdivision (e.g., precision) may refer to capable of expressing the object 1001 in detail. In other words, as the number of screen components (e.g., pixels) included in the same unit area increases, the object 1001 may be expressed in detail (or subdivided). As another example, as the size of the square increases and the number of squares decreases, the degree of subdivision (e.g., precision) may decrease.

In FIG. 10 according to an embodiment, the number of squares 1011 according to the first level of precision may be smaller than the number of squares 1051 according to the second level of precision. As another example, the size of the square 1011 according to the first level of precision may be larger than the size of the square 1051 according to the second level of precision.

In an embodiment, as the second level of precision is higher than the first level of precision, the spatial model 1061 according to the spatial mapping of the object 1001 at the second level of precision according to reference numeral <1050> may be generated in a form similar to the object 1001 rather than the spatial model 1021 according to the spatial mapping of the object 1001 at the first level of precision according to the reference numeral <1010>.

Figure 11:
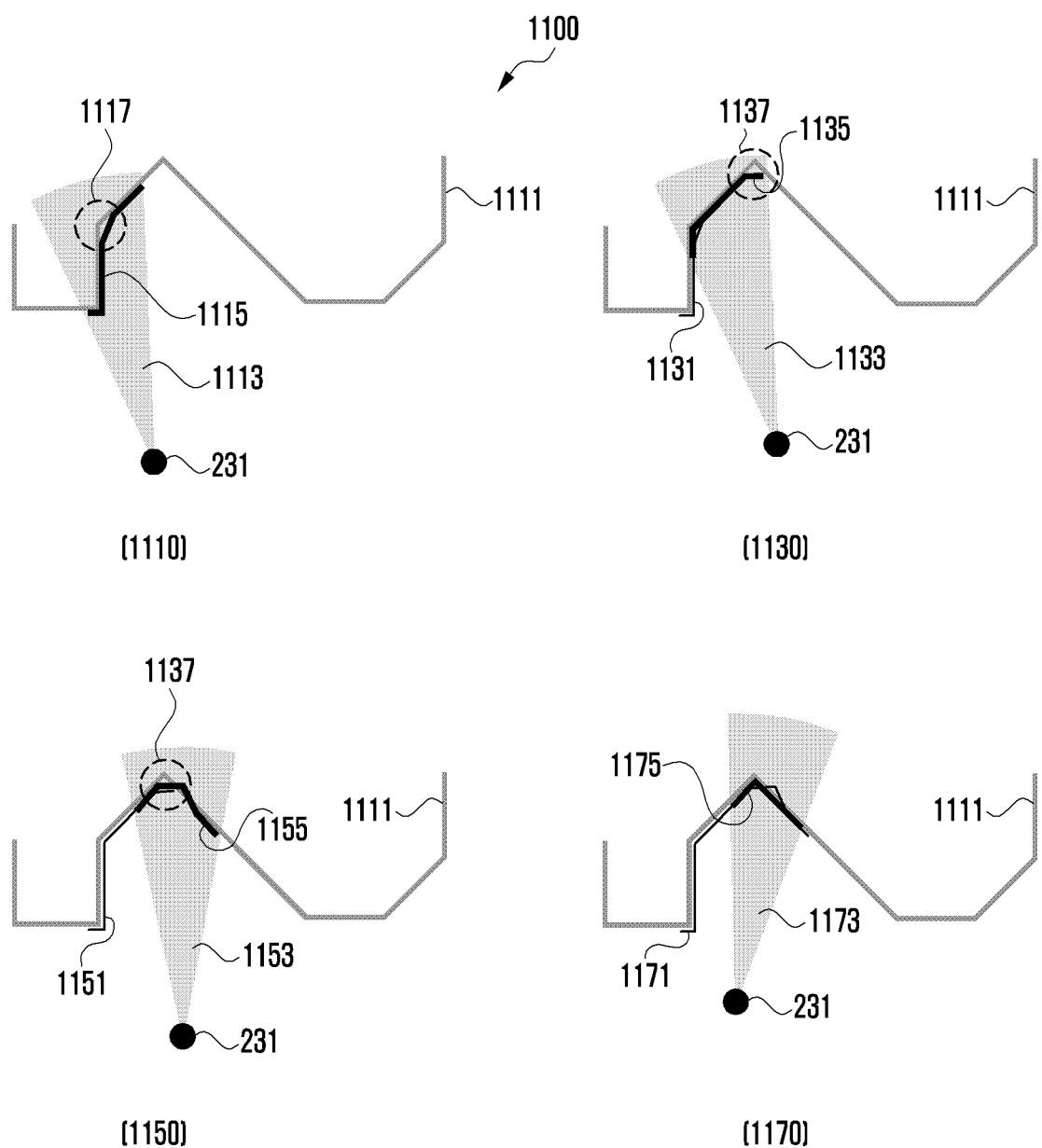
FIG. 11 illustrates an example method for performing spatial mapping according to certain embodiments.

FIG. 11 is a diagram 1100 illustrating a method for performing spatial mapping according to certain embodiments.

FIG. 11 according to certain embodiments is a diagram illustrating an operation of generating a spatial model. Reference numeral <1111> of FIG. 11 may indicate an outline of an object on which spatial mapping is to be performed. Spatial mapping may be executed continuously over every frame of capture, or intermittently, such as on every nth-frame of capture, or on every frame for a preset number of frames. By performing spatial mapping over multiple frames, it is possible to prevent degradation of mapping as caused by obscuration by other objects, or from incomplete or inaccurate modeling of shapes due to incomplete depth information. In addition, when a morphological change of an object occurs, spatial mapping over multiple frames may reflect the morphological change of the object.

Referring to FIG. 11, a processor (e.g., the processor 260 of FIG. 2) of an electronic device (e.g., the electronic device 201 of FIG. 2) may perform spatial mapping for a first region of an object corresponding to a first camera (e.g., the first camera 231 of FIG. 2) and a first field of view (FOV) 1113 of the first camera 231 based on depth information, as shown by reference numeral <1110>. Reference numeral <1115> may indicate a result of spatial mapping for the first region of the object. The processor 260 may be configured to generate a spatial model 1131 for the first region by performing spatial mapping for the first region of the object, as shown by reference numeral <1130>.

In an embodiment, as shown by reference numeral <1117>, an error in mapping may occur between an outline 1111 of the first region corresponding to the first FOV 1113 of the object and the spatial mapping result 1115. The processor 260 may be configured to continuously perform spatial mapping for the object by changing the position or angle of the electronic device 201.

For example, as shown in the reference numeral <1130>, the processor 260 may perform spatial mapping for a second region of an object corresponding to the first camera 231 and the second FOV 1133 of the first camera 231 based on the depth information, as shown in the reference numeral <1130>. The range of the second FOV 1133 may partially overlap with the range of the first FOV 1113. Reference numeral <1135> may indicate a result of space mapping for the second region of the object. The processor 260 may perform spatial mapping for the second region of the object, and merge the same with a spatial model 1131 of the first region, so as to generate a spatial model 1151 for the first region and the second region, as shown in the reference numeral <1150>. By performing spatial mapping for the second region corresponding to the second FOV 1133 partially overlapping with the range of the first FOV 1113, the error 1117 shown in the reference numeral <1110> may be corrected.

As another example, the processor 260 may be configured to perform spatial mapping for a third region of an object corresponding to the first camera 231 and a third FOV 1153 of the first camera 231 based on the depth information, as shown by reference numeral <1150>. The range of the third FOV 1153 may partially overlap with the range of the first FOV 1113 and/or the second FOV 1133. The processor 260 may perform spatial mapping for the third region of the object, and merge the spatial model of the first region and the spatial model 1151 of the second region as shown by reference numeral <1170>, so as to generate a spatial model 1171 for the first region, the second region, and the third region.

As another example, the processor 260 may be configured to perform spatial mapping of a fourth region of an object corresponding to the first camera 231 and a fourth FOV 1173 of the first camera 231 based on the depth information, as shown by reference numeral <1170>. A range of the fourth FOV 1173 may partially overlap with the range of the first FOV 1113, the second FOV 1133, and/or the third FOV 1153. Reference numeral <1175> may indicate a result of spatial mapping for the fourth region of the object. The processor 260 may perform spatial mapping for the fourth region of the object and merge the spatial model of the first region, the spatial model of the second region, and the spatial model 1171 of the third region so as to generate a spatial model (not shown) for a first region, the second region, the third region, and the fourth region. By performing spatial mapping for a fourth region corresponding to the fourth FOV 1173 partially overlapping the range of the first FOV 1113, the second FOV 1133, and/or the third FOV 1153, an error 1137 shown in reference numerals <1130> and <1150> may be corrected.

Figure 12:
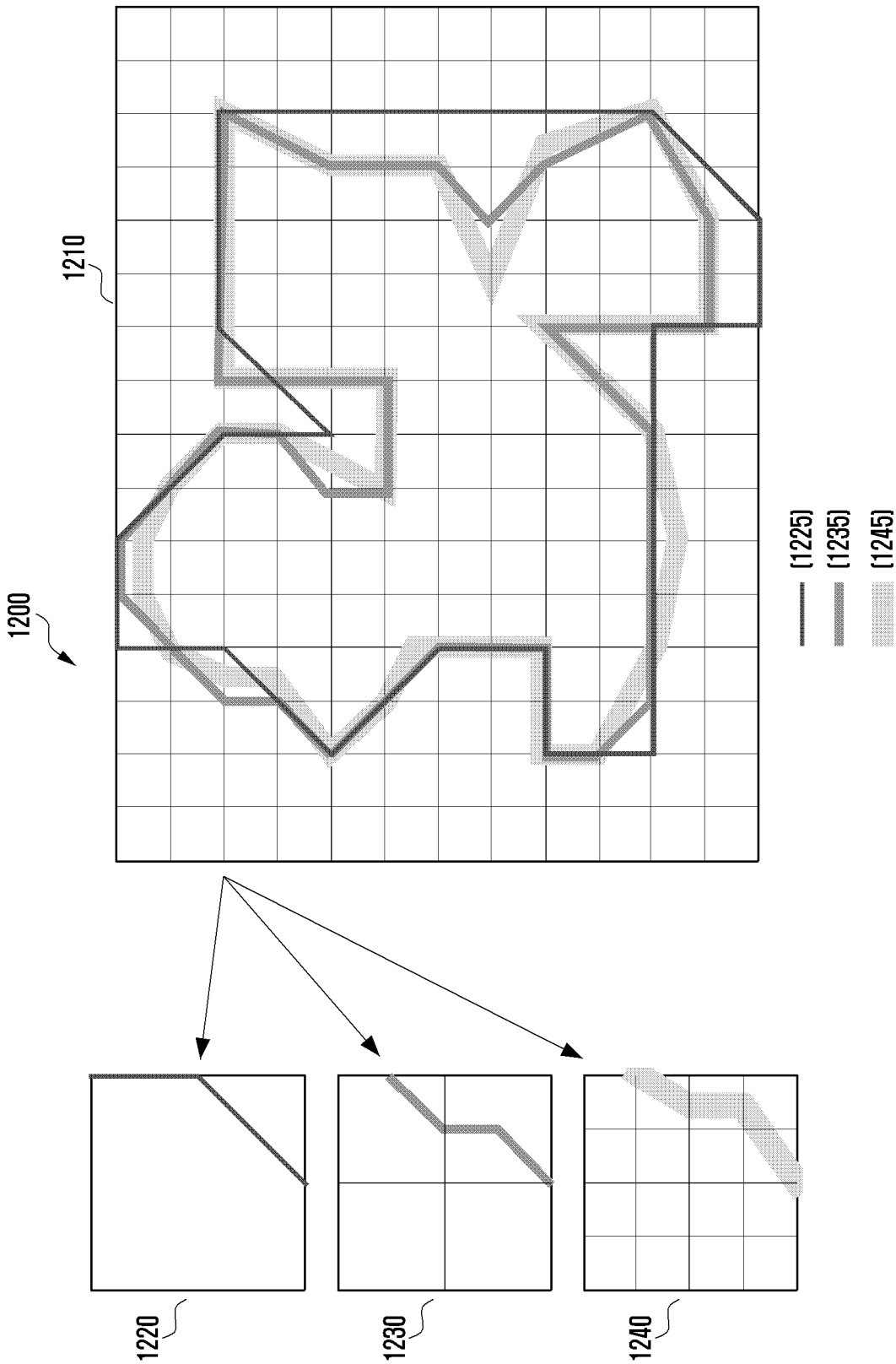
FIG. 12 illustrates an example method for performing spatial mapping according to certain embodiments.

FIG. 12 is a diagram 1200 illustrating a method for performing spatial mapping according to certain embodiments.

Referring to FIG. 12, the precision level may include a first level 1220, a second level 1230, and a third level 1240. However, the disclosure is not limited thereto, and the precision level may be configured by more than three levels.

In an embodiment, the precision level may be divided based on the size of the square and the number of squares. The size of the square and the number of squares may indicate the degree of subdivision for the same area. For example, as the size of the square decreases and the number of squares increases, the degree of subdivision (e.g., precision) may increase. A high degree of subdivision (e.g., precision) may refer to capable of expressing a specific object in detail. In other words, as the number of screen components (e.g., pixels) included in the same unit area increases, the specific object may be expressed in detail (or subdivided). As another example, as the size of the square increases and the number of squares decreases, the degree of subdivision (e.g., precision) may decrease.

In an embodiment, as the level increases in the order of the first level 1220, the second level 1230, and the third level 1240, the number of squares may increase. The disclosure is not limited thereto, and as the level increases in the order of the first level 1220, the second level 1230, and the third level 1240, the size of the square may decrease. Such a level increase in the order of the first level 1220, the second level 1230, and the third level 1240 may indicate a higher precision with regard to image data.

For example, a square according to each level of precision may include nine virtual points including four vertices, the midpoint of four sides, and one point in the middle of the square. In addition, spatial mapping may be performed by connecting two points (or three points in a case of including a midpoint) among nine virtual points in each of the squares. For example, the precision of first level 1220 may be configured by connecting two or three points among the nine virtual points, the precision of second level 1230 may be configured by connecting two or three points among nine virtual points of the square having the size smaller than the square of the first level 1220, and the precision of third level 1240 may be configured by connecting two or three points among the nine virtual points of the square having the size smaller than the square of the second level 1230.

In an embodiment, as shown by reference numeral <1210>, when spatial mapping of an object is performed based on the precision of first level 1220, a first spatial model 1225 for the object may be generated. In another embodiment, when spatial mapping of an object is performed based on the precision of second level 1230, a second spatial model 1235 for the object may be generated. In another embodiment, when spatial mapping of an object is performed based on the precision of third level 1240, a third spatial model 1245 for the object may be generated. In certain embodiments, the processor 260 may be configured to combine polygons of the third spatial model 1245 for the object generated based on the precision of third level 1240, so as to obtain the spatial model of the first level 1220 and the second level 1230, and generate phase information between different precision levels based on the obtained spatial models of the first level 1220 and the second level 1230.

FIG. 13 is a diagram 1300 illustrating a method for generating a spatial model according to certain embodiments.

Referring to FIG. 13, a processor (e.g., the processor 260 of FIG. 2) of an electronic device (e.g., the electronic device 201 of FIG. 2) may be configured to generate an adaptive spatial model for image data acquired using a first camera (e.g., the first cameral 231 of FIG. 2) based on a precision map and a spatial model.

In an embodiment, as shown by reference numeral <1310>, image data may be adapted into the form of a polygon mesh. For example, a mesh may be formed via polygons (e.g., triangle, square, or other figure) configured by vertices (e.g., points), and polygon mesh models may be used to represent 3D geometric objects configured by multiple meshes. The polygon mesh model depicts shape information about the surface of a 3D geometric object, and an interior thereof is shown as an unfilled shape. The precision of the polygon mesh model may be configured based on the size of polygons configuring the mesh. For example, in order to increase the accuracy and precision of rendering a particular object, the size of the rendering polygons may be reduced and the count of polygons utilized may be increased.

In an embodiment, the processor 260 may be configured to apply a precision map shown by reference numeral <1320> to a part of a spatial model in a state where spatial modeling of the image data is completed. For example, the precision map shown by reference numeral <1320> may be expressed as a spatial model having high precision for a partial region in the image data and a spatial model having low precision for a region excluding the partial region. For example, when the user's gaze information is detected in a specific object 1311, the processor 260 may configure a region 1321 of the specific object 1311 to have high precision, and configure a region 1323 excluding the region 1321 of the specific object 1311 to have low precision. The processor 260 may generate a precision map for the image data based on the configured precision.

In an embodiment, the processor 260 may be configured to apply the precision map to a part of the spatial model to perform adaptive rendering with regard to the spatial model, as shown by reference numeral <1330>. For example, as the region 1321 of the specific object 1311 in which the user's gaze information is detected is configured to have high precision, the size of a polygon, for example a triangle, configuring the mesh of the object 1331 illustrated by reference numeral <1330> may be smaller than the size of a triangle configuring the mesh of the object 1311 illustrated by reference numeral <1310>. In addition, the number of triangles configuring the mesh of the object 1331 illustrated by reference numeral <1330> may be greater than the number of triangles configuring the mesh of the object 1311 illustrated by reference numeral <1310>. As the spatial model is adaptively rendered based on the precision map in which the precision is configured differently, the region 1321 of the specific object 1311 in which the user's gaze information is detected may be displayed in detail.

Figure 14:
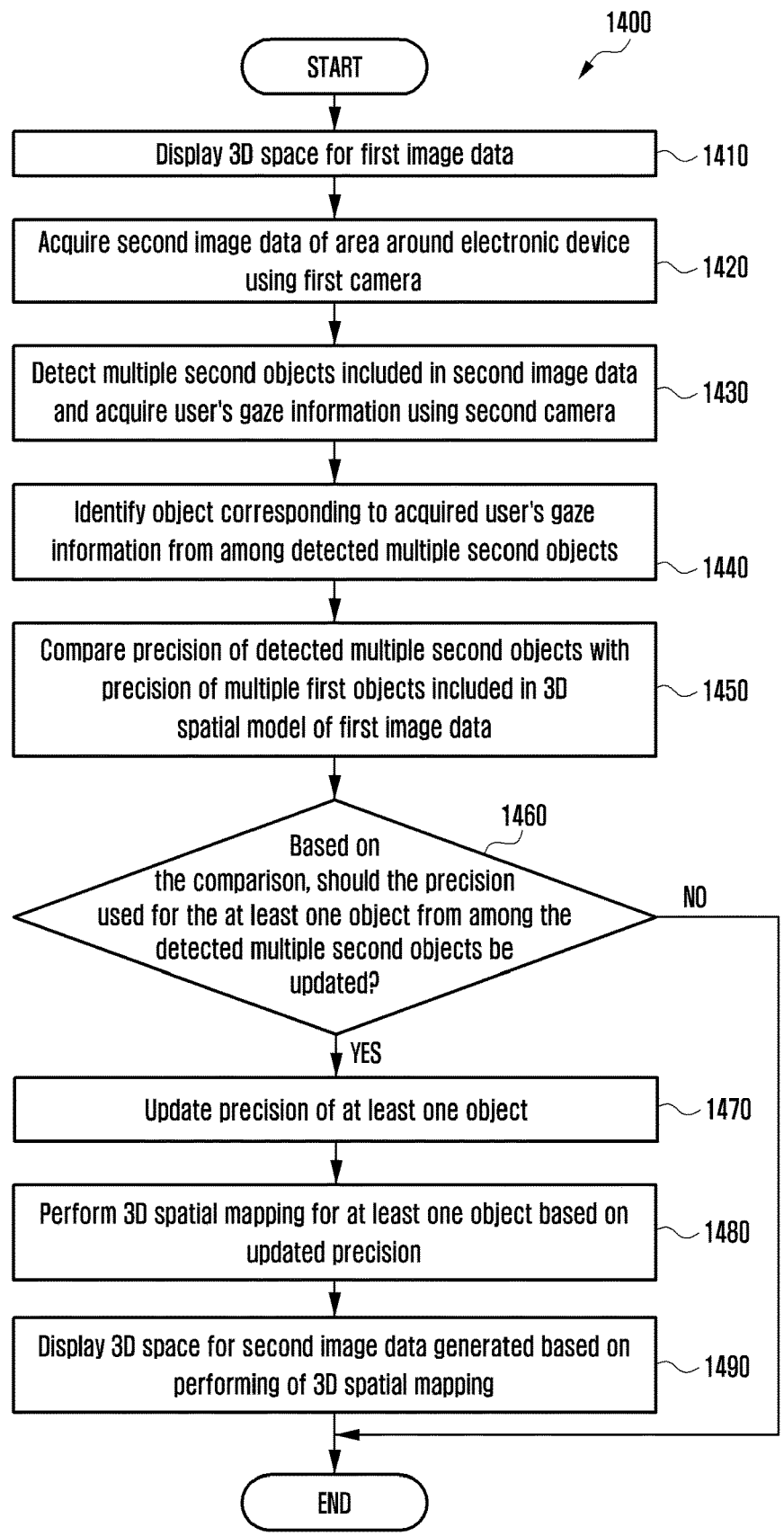
FIG. 14 is a flowchart illustrating an example method for updating image data according to certain embodiments.

FIG. 14 is a flowchart 1400 illustrating a method for updating image data according to certain embodiments.

FIG. 14 according to certain embodiments may be an additional operation of FIG. 3 described above. Since operations 1420 to 1440 of FIG. 14 according to certain embodiments are similar to operations 310 to 340 of FIG. 3 described above, a description thereof may be replaced by the description associated with FIG. 3.

Referring to FIG. 14, in operation 1410, a processor (e.g., the processor 260 of FIG. 2) of an electronic device (e.g., the electronic device 201 of FIG. 2) may display a 3D space for first image data. For example, operation 1410 may correspond to operation 370 of FIG. 3 described above.

In an embodiment, the processor 260 (e.g., the image data acquisition module 271 of FIG. 2) may be configured to acquire second image data around the electronic device 201 by using a first camera (e.g., the first camera 231 of FIG. 2) in operation 1420. The processor 260 (e.g., the object detection module 275 and the gaze tracking module 274 of FIG. 2) may detect multiple second objects included in the second image data, and may acquire a user's gaze information using a second camera (e.g., the second camera 232 of FIG. 2), in operation 1430. The processor 260 may identify an object corresponding to the acquired user's gaze information from among the detected multiple second objects in operation 1440.

In an embodiment, in operation 1450, the processor 260 may compare the precision of the detected multiple second objects with the precision of the multiple first objects included in a 3D spatial model of the first image data. For example, the processor 260 may compare the precision of the multiple second objects detected in the second image data and the precision of the multiple objects (e.g., the multiple first objects) detected in the first image data configured in operation 350 of FIG. 3 described above.

In an embodiment, the processor 260 (e.g., the spatial mapping module 272) may measure the angular velocity and acceleration of the electronic device 201 by using a sensor circuit (e.g., the sensor circuit 240 of FIG. 2), for example, a gyro sensor (e.g., the gyro sensor 241 of FIG. 2) and an acceleration sensor (e.g., the acceleration sensor 243 of FIG. 2). The processor 260 may identify the degree of movement and rotation of the electronic device 201 based on the measured angular velocity and acceleration. The processor 260 may identify the position (and/or angle) of the electronic device 201 in space based on the identified degree of movement and rotation of the electronic device 201. The processor 260 (e.g., the spatial model management module 276) may compare the spatial mapping result based on the position (and/or angle) of the electronic device 201 with the previous spatial mapping result.

In an embodiment, the processor 260 may determine whether the precision of at least one object among the detected multiple second objects should be updated, in operation 1460. When it is identified that the update of the precision of at least one object among the detected multiple second objects is to be executed (e.g., "YES" in operation 1460), the processor 260 may update the precision of the at least one object in operation 1470. The processor 260 may perform 3D spatial mapping for the second image data based on the updated precision of at least one object and the precision configured in at least one other object, in operation 1480. The processor 260 may display a 3D space for the second image data generated based on the performing of 3D spatial mapping, in operation 1490.

In an embodiment, when it is identified that the update of the precision of at least one object among the detected multiple second objects is not required (e.g., "NO" in operation 1460), the processor 260 may terminate the operation of FIG. 14. For example, the processor 260 may perform 3D spatial mapping for the second image data based on the precision configured for the first image data. The processor 260 may display a 3D space for the second image data generated based on the performing of 3D spatial mapping.

Figure 15:
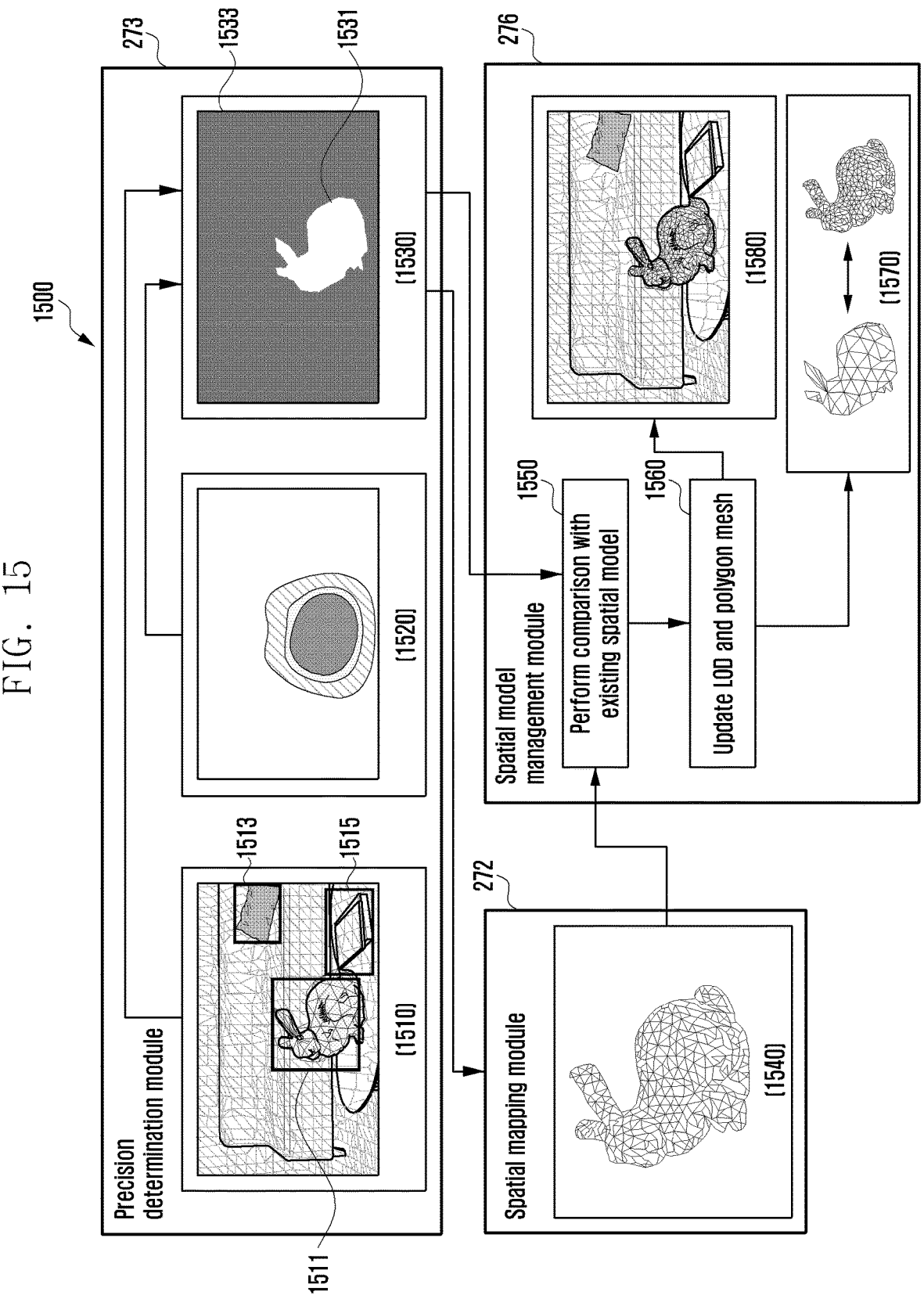
FIG. 15 illustrates an example method for updating image data according to certain embodiments.

FIG. 15 is a diagram 1500 illustrating a method for updating image data according to certain embodiments.

Referring to FIG. 15, a processor (e.g., the processor 260 of FIG. 2) of an electronic device (e.g., the electronic device 201 of FIG. 2) may be configured to detect multiple objects from second image data acquired using a first camera (e.g., the first camera 231 of FIG. 2), as shown by reference numeral <1510>, in a state where a spatial model for first image data is configured. For example, the detected multiple objects may include a first object 1511, a second object 1513, and a third object 1515.

In certain embodiments, the first image data and the second image data may include the same or partially same region.

In an embodiment, the processor 260 may track one point on a display (e.g., the display 250 of FIG. 2) that a user of the electronic device 201 gazes at using a second camera (e.g., the second camera 232 of FIG. 2). The processor 260 may accumulate (e.g., aggregate) and store the user's gaze information acquired for a designated period of time, and may acquire a result of tracking the accumulated user's gaze information. The processor 260 may identify a specific object corresponding to the accumulated user's gaze information among the multiple objects based on the detected multiple objects and the accumulated user's gaze information. For example, reference numeral <1520> indicates visualization of the accumulated user's gaze information in the form of a heat map (e.g., visualized in the form of shading and hatching), and a specific object corresponding to the accumulated user's gaze information may be identified as the first object 1511.

In an embodiment, as described above with reference to FIG. 5, the processor 260 may allocate identification information to each of multiple objects, and may store and manage state information for a region of interest for each object.

In an embodiment, the processor 260 may generate a precision map for the second image data based on the state information for a region of interest for each object. The precision map may be generated based on the detected multiple objects, accumulated user's gaze information, and/or depth information of each object. The processor 260 may configure a different pixel value for each region of each object with respect to the second image data, and may apply different precision to each region of each object based on the configured pixel value. For example, the processor may configure pixels included in a region 1531 of the first object 1511 corresponding to the accumulated user's gaze information to have a first value, and may configure pixels included in a region 1533 other than the region 1531 of the first object 1511 to have a second value. As shown by reference numeral <1530>, the processor 260 may generate a precision map based on a configured precision that is differently applied based on a configured pixel value.

In an embodiment, the processor 260 may perform spatial mapping for the second image data based on a precision map generated by applying different precisions, as shown by reference numeral <1540>. The processor 260 may acquire a new polygon mesh based on performing of the spatial mapping. The processor 260 (e.g., the spatial model management module 276) may compare a spatial model generated by performing spatial mapping of the second image data with a pre-stored spatial model (indicated by reference numeral 1550).

In an embodiment, if it is identified that the update of the precision of at least one object included in the second image data is to be executed, based on a result of the comparison, the processor 260 may update the precision and/or polygon mesh for the first object 1511, as shown by reference numeral <1570>. For example, under an assumption that the first level of precision is stored in the memory 220, the desired precision is implemented by, for example, 8 cm-sized polygons, and the newly acquired polygon mesh is configured by 2 cm-sized polygons, the processor 260 may recalculate the 4 cm polygon mesh and/or the 8 cm polygon mesh and calculate the phase information between the 2 cm, 4 cm, and 8 cm polygon meshes based on the 2 cm polygon mesh, so as to update precision phase information (e.g., phase information about a result of spatial mapping performed with a low level of precision (e.g., the first level) and a result of spatial mapping performed with a high level of precision (e.g., the third level) with regard to a specific object) and/or a polygon mesh.

In an embodiment, the processor 260 may perform 3D spatial mapping for the second image data based on the updated precision of at least one object and the precision configured in at least one other object. The processor 260 may display a 3D space for the second image data generated based on performing of the 3D spatial mapping, as shown by reference numeral <1580>.

In an embodiment, when it is identified that an update of the precision of the first object 1511 included in the second image data is not required, based on a result of the comparison, the processor 260 may omit execution of an update the precision of the first object 1511 and/or the polygon mesh.

Figure 16:
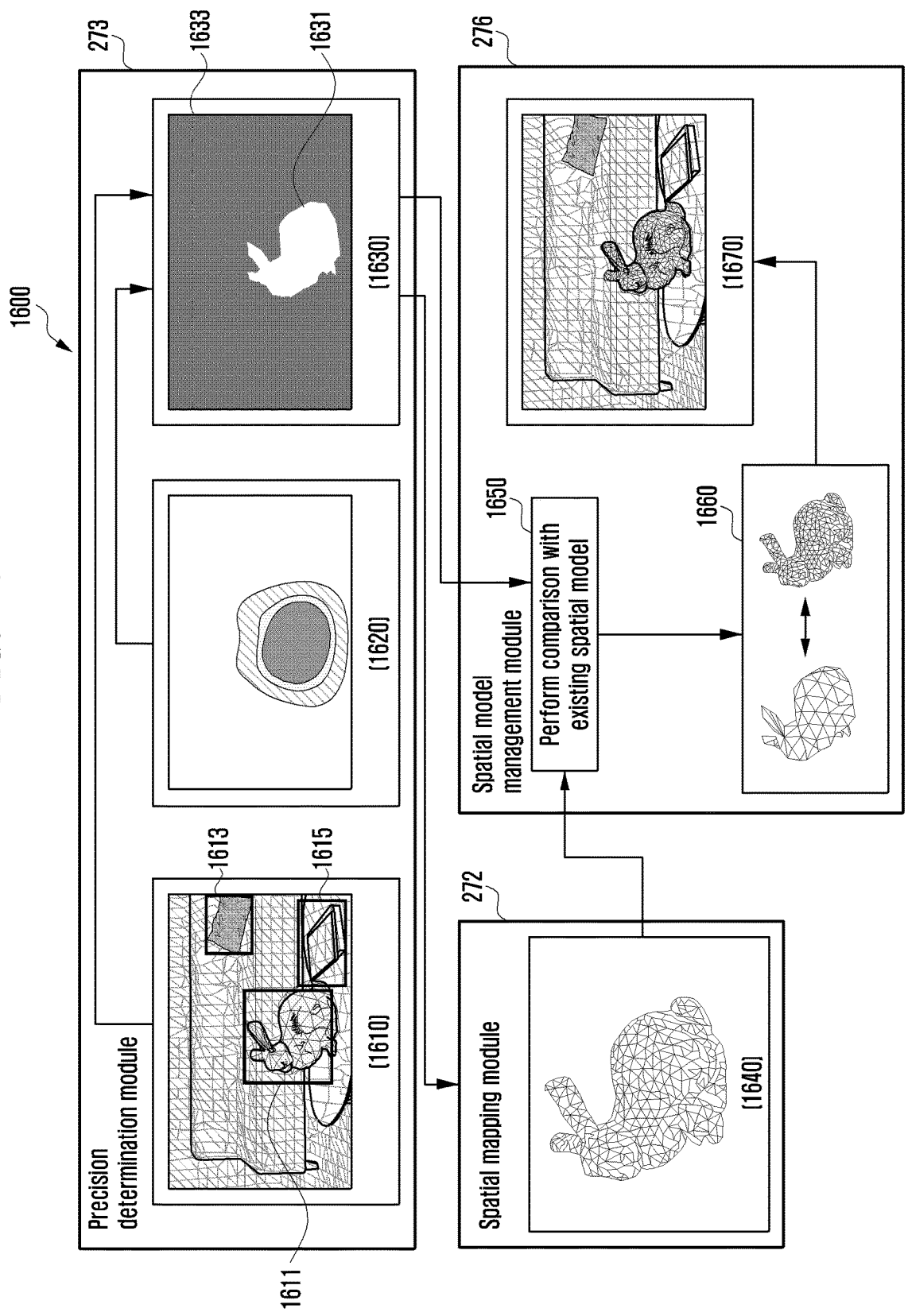
FIG. 16 illustrates a method for updating image data according to certain embodiments.

FIG. 16 is a diagram 1600 illustrating a method for updating image data according to certain embodiments.

FIG. 16 according to certain embodiments is a diagram illustrating a method for performing spatial mapping when spatial mapping based on a detail map generated by comparison with FIG. 15 is impossible.

Operations indicated by reference numerals <1610> to <1650> of FIG. 16 according to certain embodiments may be the same as operations indicated by reference numbers <1510> to <1550> of FIG. 15 described above.

Referring to FIG. 16, a processor (e.g., the processor 260 of FIG. 2) of an electronic device (e.g., the electronic device 201 of FIG. 2) may invoke a third level of precision in a precision map with regard to a first object 1611 corresponding to the accumulated user's gaze information. As the distance from the electronic device 201 exceeds a designated distance, although spatial mapping of the first object 1611 based on the first level of precision is possible, a spatial model based on the third level of precision having a higher precision than the first level may be stored therein. Here, the processor 260 may perform comparison with the pre-stored spatial model 1650 to discover whether a third level of precision exists with respect to the region of the first object 1611. When the third level of precision for the region of the first object 1611 exists, the processor 260 may render the region of the first object 1611 invoking the third level of precision to be expressed with the third level of precision, as shown by reference numeral <1660>.

In certain embodiments, although not shown, in order to generate a spatial model based on a precise level of precision with regard to the region of the first object 1611, the processor 260 may generate a prompt requesting that the electronic device 201 be moved closer to the first object 1611. For example, it is assumed that a mesh can be generated with precision corresponding to a specific pixel (e.g., 10 pixels) on a display (e.g., the display 250 of FIG. 2). When the electronic device 201 is located at a distance exceeding a designated distance from the first object 1611, the length of the first object 1611 corresponding to a specific pixel (e.g., 10 pixels) may have a first length (e.g., 8 cm). However, when the electronic device 201 is located within a designated distance from the first object 1611, the length of the first object 1611 may be a second length (e.g., 2 cm) shorter than the first length (e.g., 8 cm). In other words, when spatial mapping is performed while the electronic device 201 is close to the first object 1611, the processor 260 may be configured to generate a spatial model of the first object 1611 having a higher degree of precision (e.g., a third level) as shown by reference numeral <1670>.

In an embodiment, with regard to an object from which the user's gaze information is detected, when a high level of precision (e.g., a third level) for the current spatial model does not exist, and that the electronic device 201 can perform spatial mapping with the higher level of precision (e.g., a third level) when the electronic device 201 is disposed closer to the object to which the user's gaze information is detected, the processor 260 may display, on the display 250, a guidance (e.g., a message) prompting a user to move the electronic device closer to the object.

A spatial mapping method for the electronic device 201 according to certain embodiments may include acquiring image data around the electronic device 201 by using a first camera (e.g., the first camera 231 of FIG. 2), detecting multiple objects included in the image data, acquiring a user's gaze information by using a second camera (e.g., the second camera 232 of FIG. 2), identifying an object corresponding to the acquired gaze information among the detected multiple objects, configuring the precision of the identified object to be higher than the precision of at least one other object, performing 3D spatial mapping for the image data based on the precision configured in the identified object and the precision configured in the at least one other object, and displaying, on the display 250, a 3D space for the image data generated based on the performing of the 3D spatial mapping.

In certain embodiments, the performing of the 3D spatial mapping for the image data may include generating a precision map for the image data based on the precision configured in the identified object and the precision configured in the at least one other object, and performing of the 3D spatial mapping for the image data based on the generated precision map.

In certain embodiments, the spatial mapping method for the electronic device 201 may further include obtaining depth information of a region of each of the multiple objects detected from the image data, configuring pixels included in a region configuring the identified object to have a first value and configure pixels, which are included in a region other than the region configuring the identified object, to have a second value, based on the obtained depth information, and generating a precision map for the image data based on the configured first value and the second value.

A spatial mapping method for the electronic device 201 according to certain embodiments may include multiplying location information of the identified object by the depth information of the identified object, when a value obtained by the multiplication exceeds a designated value, configuring pixels included in a region configuring the shape of the identified object to have a first value, and configuring pixels, which are included in a region other than the region configuring the shape of the identified object, to have a second value, and generating a precision map for the image data based on the configured first value and second value.

A spatial mapping method for the electronic device 201 according to certain embodiments may further include acquiring second image data around the electronic device 201 by using the first camera 231, detecting multiple second objects included in the second image data, acquiring the user's gaze information by using the second camera 232, identifying an object corresponding to the acquired user's gaze information among the detected multiple second objects, comparing the precision of the detected multiple second objects with the precision of the multiple objects included in the 3D spatial model for the image data, and when the precision of at least one object among the detected multiple second objects is identified as to be updated, based on a result of the comparison, updating the precision of the at least one object.

A spatial mapping method for the electronic device 201 according to certain embodiments may further include, when the precision of at least one object among the detected multiple second objects is identified not required for updating, based on a result of the comparison, performing 3D spatial mapping for the second image data based on the precision configured in the identified object in the image data and the precision configured in the at least one other object.

A spatial mapping method for the electronic device 201 according to certain embodiments may further include allocating identification information to each of the detected multiple objects, and storing, in a memory (e.g., the memory 220 of FIG. 2), identification information of each of the multiple objects and state information for a region of interest of the each object.

A spatial mapping method for the electronic device 201 according to certain embodiments may further include configuring the state information for a region of interest of the each object, based on whether a period of time during which the user's gaze information is maintained for a region of each of the multiple objects exceeds a designated period of time.

In certain embodiments, the configuring of the state information for a region of interest of the each object may include configuring, as a region of interest, a region in which the period of time during which the user's gaze information is maintained exceeds the designated period of time, and not configuring, as the region of interest, a region in which the period of time during which the user's gaze information is maintained is equal to or less than the designated period of time, or in which the user's gaze information is not detected.

A spatial mapping method for the electronic device 201 according to certain embodiments may further include acquiring the user's gaze information for a designated period of time by using the second camera 232, accumulating the user's gaze information acquired during the designated period of time, and storing the accumulated user's gaze information in the memory 220.

A spatial mapping method for the electronic device 201 according to certain embodiments may further include configuring the size of a region centered on one point on the display 250 based on the accumulated user's gaze information, and configuring the region of the configured size in the image data as a region of interest.

Certain embodiments disclosed in this specification and drawings have merely presented specific examples in order to easily describe technical contents of the disclosure and to help understanding of the disclosure, but are not intended to limit the scope of the disclosure. Accordingly, all changes or modified forms derived based on the technical aspects of the disclosure should be construed as being included in the scope of the disclosure in addition to the embodiments disclosed herein.

What is claimed is:

1. An electronic device, comprising:
a first camera;
a second camera;
a display;
a memory; and
a processor operatively connected to the first camera, the second camera, the display, and the memory,
wherein the processor is configured to:
acquire image data around the electronic device via the first camera,
detect a plurality of objects included in the image data,
detect a gaze of a user via the second camera,
identify a first object corresponding to the detected gaze among the detected plurality of objects,
configure a first precision for spatial mapping of the identified first object and a second precision of at least one other object from among the detected plurality of objects, wherein the first precision is higher than the second precision,
execute 3-dimensional (3D) spatial mapping on the image data using the first precision for the identified first object and the second precision for the at least one other object, and
display, on the display, a 3D space for the image data generated based on the executed 3D spatial mapping.

2. The electronic device of claim 1, wherein the processor is further configured to:
generate a precision map for the image data based on the first precision and the second precision,
wherein the 3D spatial mapping is further executed on the image data based on the generated precision map.

3. The electronic device of claim 1, wherein the processor is further configured to:
detect depth information for respective display regions of each of the plurality of objects detected from the image data,
based on the detected depth information, set a first value for pixels disposed in a first display region in which the identified first object is disposed, and set a second value for pixels disposed in a second display region different from the first display region,
generate a precision map for the image data based at least on the set first value and the set second value.

4. The electronic device of claim 1, wherein the processor is further configured to:
detect, from the image data, depth information associated with the identified first object,
execute a multiplication of coordinates associated with the identified first object by detected depth information,
when a value resultant from the multiplication exceeds a predesignated threshold value, set a first value for pixels disposed in a first display region corresponding to a shape of the identified first object, and set a second value for pixels disposed in a second display region different from the first display region, and
generate a precision map for the image data based on at least one the set first value and the set second value.

5. The electronic device of claim 1, wherein the processor is further configured to:
acquire second image data around the electronic device is disposed via the first camera,
detect a second plurality of objects included in the second image data,
detect the gaze via the second camera,
identify a second object corresponding to the redetected gaze from among the detected second plurality of objects,
compare a third precision associated with the detected second plurality of objects with the first precision, to determine whether a specific precision of at least one object from among the detected second plurality of objects is to be updated, and
when the specific precision is to be updated, update the specific precision of the at least one object.

6. The electronic device of claim 5, wherein the processor is further configured to:
when the specific precision of is not to be updated, execute the 3D spatial mapping on the second image data using the first precision configured for the identified first object in the first image data, and the second precision configured for the at least one other object.

7. The electronic device of claim 1, wherein the processor is further configured to:
allocate identification information to each of the detected plurality of objects, and
store, in the memory, the allocated identification information of each of the detected plurality of objects, and state information for respective regions of interest associated with each of the plurality of objects.

8. The electronic device of claim 7, wherein the processor is further configured to:

detect a period of time for which the gaze is maintained on a particular region in which at least one object from among the plurality of objects is disposed, when the period of time exceeds a predesignated time threshold, set the particular region as a region of interest.

9. The electronic device of claim 1, wherein the processor is further configured to:

monitor the gaze of the user via the second camera for a designated period of time, and aggregate and store user gaze information based on the monitored gaze over the designated period of time in the memory.

10. The electronic device of claim 9, wherein the processor is further configured to:

based on the aggregated user gaze information, set a size defining a specific region that is centered on one point on the display, and set the specific region as a region of interest.

11. A spatial mapping method for an electronic device, the method comprising:

acquiring image data around the electronic device via a first camera;

detecting, via at least one processor, a plurality of objects included in the image data;

detecting a gaze of a user via a second camera;

identifying a first object corresponding to the detected gaze among the detected plurality of objects;

configuring a first precision for spatial mapping of the identified first object and a second precision of at least one other object from among the detected plurality of objects, wherein the first precision is higher than the second precision;

executing 3-Dimensional (3D) spatial mapping on the image data using the first precision for the identified first object and the second precision for the at least one other object; and displaying, on a display, a 3D space for the image data generated based on the executed 3D spatial mapping.

12. The method of claim 11, further comprising:

generating a precision map for the image data based on the first precision and the second precision, wherein the 3D spatial mapping is further executed on the image data based on the generated precision map.

13. The method of claim 11, further comprising:

detecting depth information for respective display regions of each of the plurality of objects detected from the image data, based on the detected depth information, setting a first value for pixels disposed in a first display region in which the identified first object is disposed, and setting a second value for pixels disposed in a second display region different from the first display region, generating a precision map for the image data based at least on the set first value and the set second value.

14. The method of claim 11, further comprising:

detecting, from the image data, depth information associated with the identified first object, executing a multiplication of coordinates associated with the identified first object by detected depth information, when a value resultant from the multiplication exceeds a predesignated threshold value, setting a first value for pixels disposed in a first display region corresponding to a shape of the identified first object, and setting a second value for pixels disposed in a second display region different from the first display region, and generating a precision map for the image data based on at least one the set first value and the set second value.

15. The method of claim 11, further comprising:

acquiring second image data of the external environment in which the electronic device is disposed via the first camera, detecting a second plurality of objects included in the second image data, re-detecting the gaze via the second camera, identifying a second object corresponding to the redetected gaze from among the detected second plurality of objects, comparing a third precision associated with the detected second plurality of objects with the first precision, to determine whether a specific precision of at least one object from among the detected second plurality of objects is to be updated, and when the specific precision is to be updated, updating the specific precision of the at least one object.

16. The method of claim 15, further comprising:

when the specific precision of is not to be updated, executing the 3D spatial mapping on the second image data using the first precision configured for the identified first object in the first image data, and the second precision configured for the at least one other object.

17. The method of claim 11, further comprising:

allocating identification information to each of the detected plurality of objects, and storing, in the memory, the allocated identification information of each of the detected plurality of objects, and state information for respective regions of interest associated with each of the plurality of objects.

18. The method of claim 17, further comprising:

detecting a period of time for which the gaze is maintained on a particular region in which at least one object from among the plurality of objects is disposed, and when the period of time exceeds a predesignated time threshold, setting the particular region as a region of interest.

19. The method of claim 11, further comprising:

monitoring the gaze of the user via the second camera for a designated period of time; and aggregating and storing user gaze information based on the monitored gaze over the designated period of time in the memory.

20. The method of claim 19, further comprising:

based on the aggregated user gaze information, setting a size defining a specific region that is centered on one point on the display, and setting the specific region as a region of interest.

* * * * *